US011510278B2

(12) United States Patent
Pan et al.

(10) Patent No.: US 11,510,278 B2
(45) Date of Patent: Nov. 22, 2022

(54) METHOD AND APPARATUS FOR NETWORK CONFIGURING SIDELINK DISCONTINUOUS RECEPTION IN A WIRELESS COMMUNICATION SYSTEM

(71) Applicant: ASUSTek Computer Inc., Taipei (TW)

(72) Inventors: Li-Te Pan, Taipei (TW); Li-Chih Tseng, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 48 days.

(21) Appl. No.: 17/152,175

(22) Filed: Jan. 19, 2021

(65) Prior Publication Data

US 2021/0227621 A1 Jul. 22, 2021

Related U.S. Application Data

(60) Provisional application No. 62/964,000, filed on Jan. 21, 2020.

(51) Int. Cl.

| | |
|---|---|
| ***H04W 76/28*** | (2018.01) |
| ***H04W 72/02*** | (2009.01) |
| ***H04W 76/27*** | (2018.01) |
| ***H04W 72/04*** | (2009.01) |
| ***H04L 1/18*** | (2006.01) |
| ***H04L 5/00*** | (2006.01) |
| ***H04W 4/40*** | (2018.01) |
| ***H04W 24/08*** | (2009.01) |

(52) U.S. Cl.
CPC ........... *H04W 76/28* (2018.02); *H04L 1/1819* (2013.01); *H04L 5/0055* (2013.01); *H04W 4/40* (2018.02); *H04W 24/08* (2013.01); *H04W 72/02* (2013.01); *H04W 72/0446* (2013.01); *H04W 76/27* (2018.02)

(58) Field of Classification Search
CPC ....... H04W 4/40; H04W 24/08; H04W 72/02; H04W 72/0446; H04W 76/27; H04W 76/28; H04L 1/1819; H04L 5/0055
See application file for complete search history.

(56) References Cited

U.S. PATENT DOCUMENTS

| | | | | |
|---|---|---|---|---|
| 2017/0245319 | A1* | 8/2017 | Yasukawa | H04W 52/0229 |
| 2019/0174411 | A1* | 6/2019 | Xu | H04W 72/0406 |
| 2019/0357177 | A1* | 11/2019 | Kuang | H04W 76/27 |
| 2021/0297842 | A1* | 9/2021 | Shrivastava | H04W 76/28 |
| 2022/0053496 | A1* | 2/2022 | Yu | H04W 72/087 |

* cited by examiner

*Primary Examiner* — Brian P Cox
(74) *Attorney, Agent, or Firm* — Skaar Ulbrich Macari, P.A.

(57) ABSTRACT

A method and device are disclosed from the perspective of a first User Equipment (UE) to support Sidelink (SL) Discontinuous Reception (DRX). In one embodiment, the method includes the first UE establishing a unicast link with a second UE. The method further includes the first UE receiving a SL DRX configuration associated with the second UE from the second UE. The method also includes the first UE transmitting the SL DRX configuration to a network node. In addition, the method includes the first UE receiving a sidelink grant from the network node, wherein the sidelink grant indicates sidelink resources. Furthermore, the method includes the first UE performing a sidelink transmission to the second UE based on the sidelink resources.

12 Claims, 14 Drawing Sheets gNB2
UE2
UE1
gNB1
Traffic pattern information of UE1
Traffic pattern or preferred SL DRX configuration
SL DRX configuration
The SL DRX configuration of UE2
The SL DRX configuration of UE2
(Updated) Uu DRX configuration

METHOD AND APPARATUS FOR NETWORK CONFIGURING SIDELINK DISCONTINUOUS RECEPTION IN A WIRELESS COMMUNICATION SYSTEM

CROSS-REFERENCE TO RELATED APPLICATIONS

The present Application claims the benefit of U.S. Provisional Patent Application Ser. No. 62/964,000 filed on Jan. 21, 2020, the entire disclosure of which is incorporated herein in their entirety by reference.

FIELD

This disclosure generally relates to wireless communication networks, and more particularly, to a method and apparatus for network configuring sidelink discontinuous reception in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first User Equipment (UE) to support Sidelink (SL) Discontinuous Reception (DRX). In one embodiment, the method includes the first UE establishing a unicast link with a second UE. The method further includes the first UE receiving a SL DRX configuration associated with the second UE from the second UE. The method also includes the first UE transmitting the SL DRX configuration to a network node. In addition, the method includes the first UE receiving a sidelink grant from the network node, wherein the sidelink grant indicates sidelink resources. Furthermore, the method includes the first UE performing a sidelink transmission to the second UE based on the sidelink resources.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: RP-193231, "New WID on NR sidelink enhancement", LG Electronics; TS 38.300 V15.6.0, "NR; NR and NG-RAN Overall Description; Stage 2 (Release 15)"; TS 38.321 V15.5.0, "NR; Medium Access Control (MAC) protocol specification (Release 15)"; TS 38.331 V15.6.0, "NR; Radio Resource Control (RRC) protocol specification (Release 15)"; TS 36.300 V16.0 0.0, "E-UTRA and E-UTRAN; Overall description; Stage 2 (Release 16)"; 3GPP email discussion [108 #44] [V2X] 38.331 running CR (Huawei), draft_R2-191xxx_ Running CR to TS 38.331 for 5G V2X with NR Sidelink_v2; and TS 23.287 V16.1.0, "Architecture enhancements for 5G System (5GS) to support Vehicle-to- Everything (V2X) services (Release 16)". The standards and documents listed above are hereby expressly incorporated by reference in their entirety.

Figure 1:
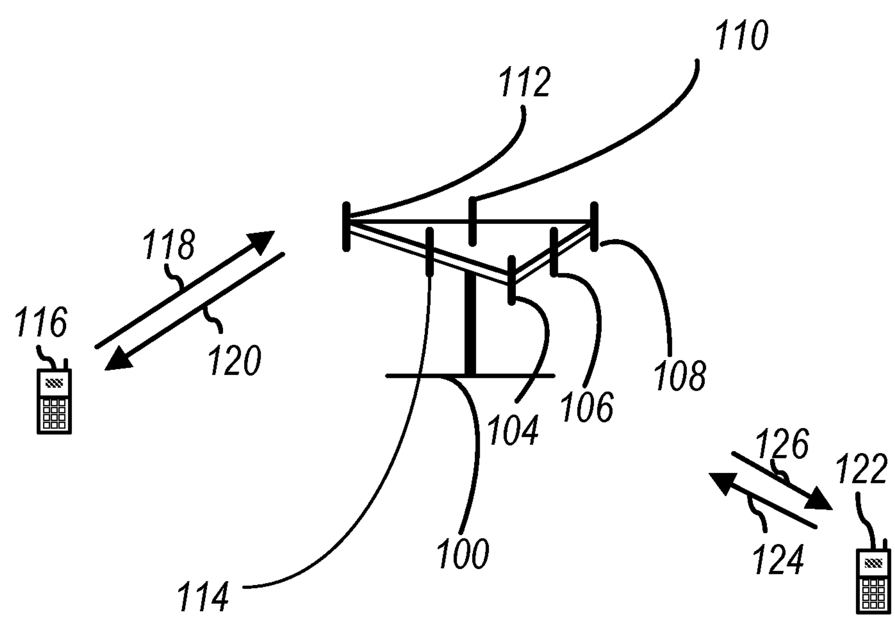
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
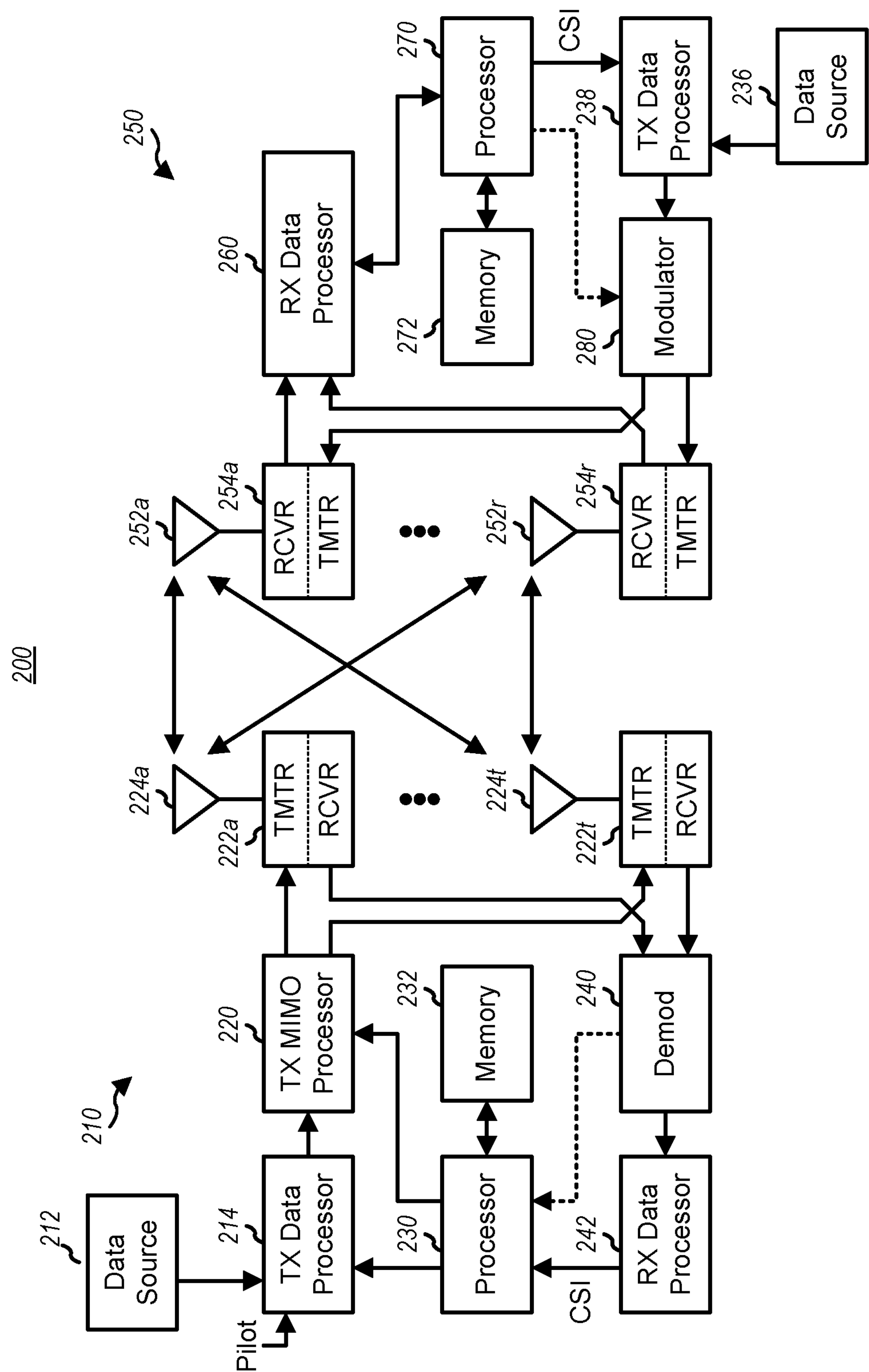
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by $N_R$ antennas 252*a* through 252*r* and the received signal from each antenna 252 is provided to a respective receiver (RCVR) 254*a* through 254*r*. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254*a* through 254*r*, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
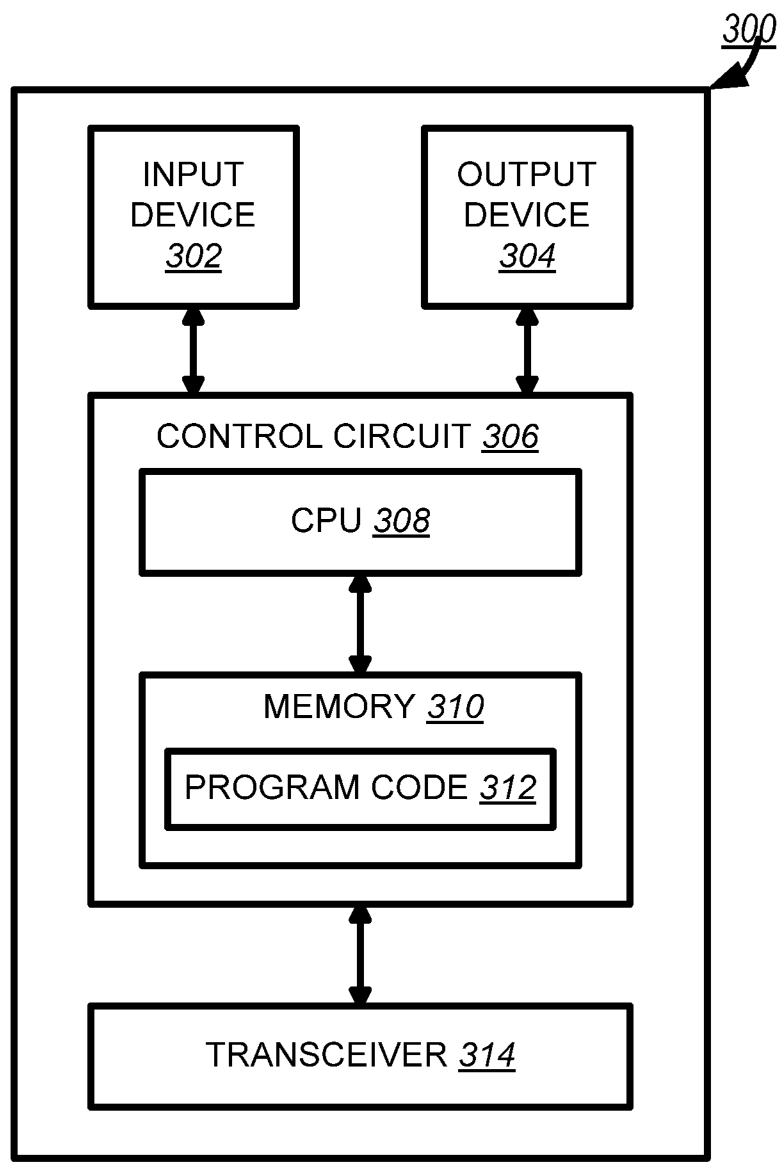
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
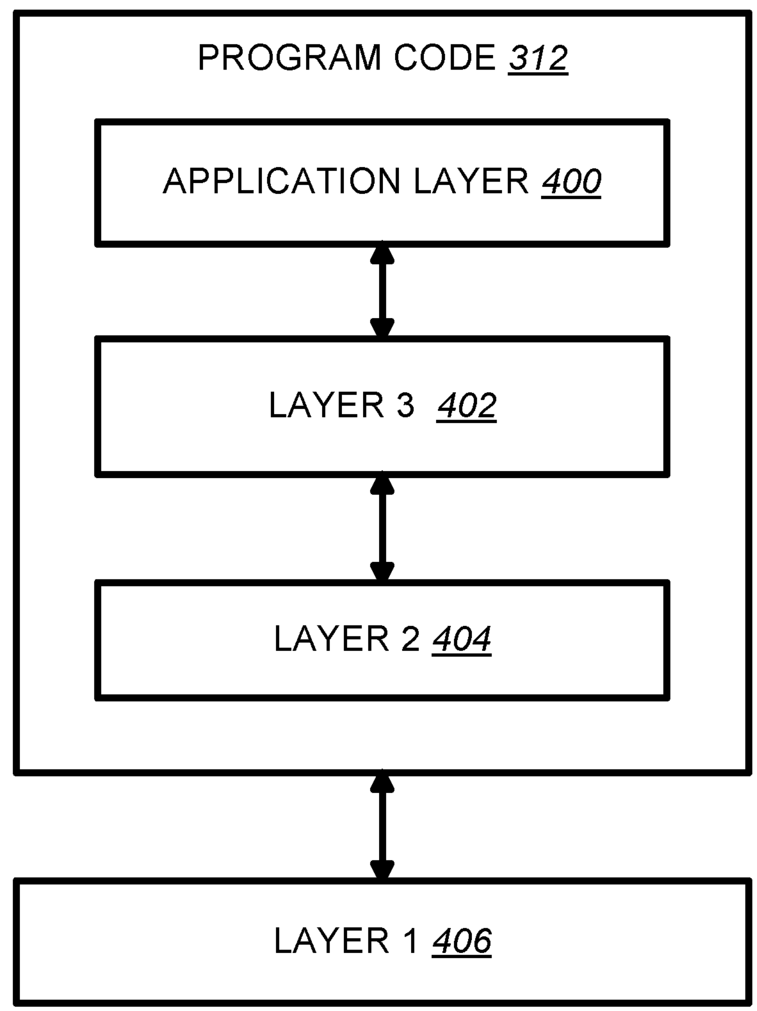
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RP-193231 states:

3 Justification

3GPP has been developing standards for sidelink as a tool for UE to UE direct communication required in various use cases since LTE. The first standard for NR sidelink is to be completed in Rel-16 by the work item "5G V2X with NR sidelink" where solutions including NR sidelink are being specified mainly for vehicle-to-everything (V2X) while they can also be used for public safety when the service requirement can be met.

Meanwhile, the necessity of NR sidelink enhancement has been identified. For V2X and public safety, the service requirements and operation scenarios are not fully supported in Rel-16 due to the time limitation, and SA works are ongoing on some enhancement in Rel-17 such as architecture enhancements for 3GPP support of advanced V2X services—Phase 2 (FS_eV2XARC_Ph2) and System enhancement for Proximity based Services in 5GS (FS_5G_ProSe). In addition, other commercial use cases related to NR sidelink are being considered in SA WGs via several work/study items such as Network Controlled Interactive Service (NCIS), Gap Analysis for Railways (MONASTERYEND), Enhanced Relays for Energy eFficiency and Extensive Coverage (REFEC), Audio-Visual Service Production (AVPROD). In order to provide a wider coverage of NR sidelink for these use cases and be able to provide the radio solutions in accordance with the progress in SA WGs, it is necessary to specify enhancements to NR sidelink in TSG RAN.

TSG RAN started discussions in RAN #84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

While several work areas have been identified in the discussion, some important principles were also discussed regarding the 3GPP evolution for NR sidelink. In dealing with different use cases in the evolution of NR sidelink, WGs should strive to achieve maximum commonality between commercial, V2X, and Critical Communication usage of sidelink in order to avoid duplicated solutions and maximize the economy of scale. In addition, enhancements introduced in Rel-17 should be based on the functionalities specified in Rel-16, instead of designing the fundamental NR sidelink functionality again in Rel-17.

4 Objective 4.1 Objective of SI or Core Part WI or Testing Part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN #88) [RAN1]

Note: TR 37.885 is reused for the other evaluation assumption and performance metric. Vehicle dropping model B and antenna option 2 shall be a more realistic baseline for highway and urban grid scenarios.

2. Resource allocation enhancement:

Specify resource allocation to reduce power consumption of the UEs [RAN1, RAN2]

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

Study the feasibility and benefit of the enhancement(s) in mode 2 for enhanced reliability and reduced latency in consideration of both PRR and PIR defined in TR37.885 (by RAN #89), and specify the identified solution if deemed feasible and beneficial [RAN1, RAN2]

Inter-UE coordination with the following until RAN #88.

A set of resources is determined at UE-A. This set is sent to UE-B in mode 2, and UE-B takes this into account in the resource selection for its own transmission.

Note: The study scope after RAN #88 is to be decided in RAN #88.

Note: The solution should be able to operate in-coverage, partial coverage, and out-of-coverage and to address consecutive packet loss in all coverage scenarios.

Note: RAN2 work will start after RAN #89.

3. Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE 4. Support of new sidelink frequency bands for single-carrier operations [RAN4]

Support of new sidelink frequency bands should ensure coexistence between sidelink and Uu interface in the same and adjacent channels in licensed spectrum.

The exact frequency bands are to be determined based on company input during the WI, considering both licensed and ITS-dedicated spectrum in both FR1 and FR2.

5. Define mechanism to ensure sidelink operation can be confined to a predetermined geographic area(s) for a given frequency range within non-ITS bands [RAN2].

This applies areas where there is no network coverage.

6. UE Tx and Rx RF requirement for the new features introduced in this WI [RAN4]

7. UE RRM core requirement for the new features introduced in this WI [RAN4]

Enhancements introduced in Rel-17 should be based on the functionalities specified in Rel-16, and Rel-17 sidelink should be able to coexist with Rel-16 sidelink in the same resource pool. This does not preclude the possibility of operating Rel-17 sidelink in a dedicated resource pool.

The solutions should cover both the operating scenario where the carrier(s) is/are dedicated to ITS and the operating scenario where the carrier(s) is/are licensed spectrum and also used for NR Uu/LTE Uu operation.

The solutions should support the network control of NR sidelink as in Rel-16, i.e., NR Uu controls NR sidelink using Layer 1 and Layer 2 signalling and LTE Uu controls NR sidelink using Layer 2 signalling.

In ITS carriers, it is assumed that any co-channel coexistence requirements and mechanisms of NR sidelink with non-3GPP technologies will not be defined by 3GPP.

3GPP TS 38.300 introduces the concept of discontinuous reception as follows:

11 UE Power Saving

The PDCCH monitoring activity of the UE in RRC connected mode is governed by DRX and BA.

When DRX is configured, the UE does not have to continuously monitor PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity (see FIG. 11-1 below);

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

Figure 5:
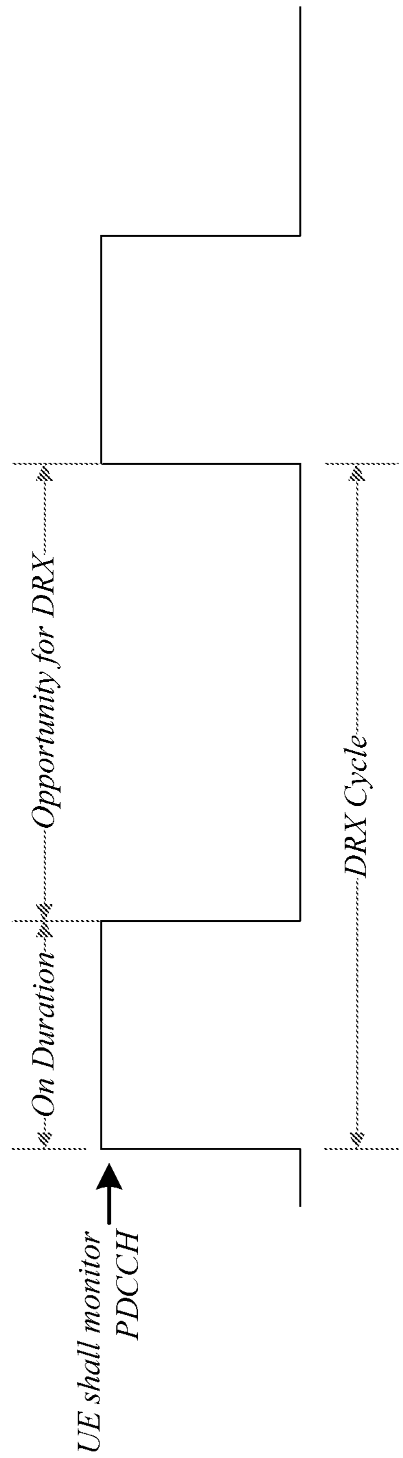
FIG. 5 is a reproduction of FIG. 11-1 of 3GPP TS 38.300 V15.6.0.
Figure 11:
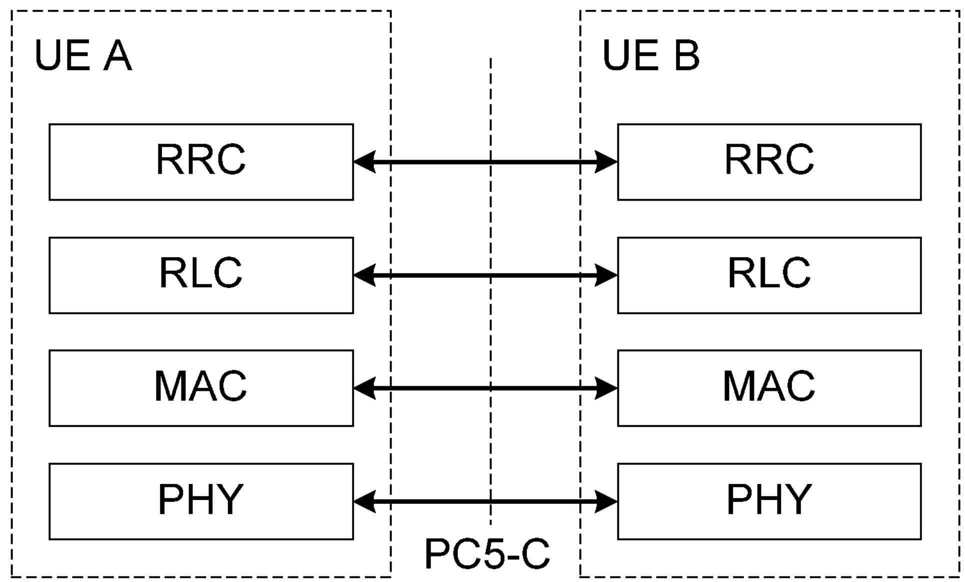
FIG. 11 is a reproduction of FIG. 23.10.2.2-1 of 3GPP TS 36.300 V16.0.0.

[FIG. 11-1 of 3GPP TS 38.300 V15.6.0, entitled "DRX Cycle", is reproduced as FIG. 5]

3GPP TS38.321 specifies the operation of discontinuous reception as follows:

5.7 Discontinuous Reception (DRX)

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other subclauses of this specification. When in RRC_CONNECTED, if DRX is configured, for all the activated Serving Cells, the MAC entity may monitor the PDCCH discontinuously using the DRX operation specified in this subclause; otherwise the MAC entity shall monitor the PDCCH as specified in TS 38.213 [6].

RRC controls DRX operation by configuring the following parameters:

drx-onDurationTimer: the duration at the beginning of a DRX Cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX Cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity.

When a DRX cycle is configured, the Active Time includes the time while:

drx-onDurationTimer or drx-InactivityTimer or drx-RetransmissionTimerDL or drx-RetransmissionTimerUL or ra-ContentionResolutionTimer (as described in subclause 5.1.5) is running; or a Scheduling Request is sent on PUCCH and is pending (as described in subclause 5.4.4); or a PDCCH indicating a new transmission addressed to the C-RNTI of the MAC entity has not been received after successful reception of a Random Access Response for the Random Access Preamble not selected by the MAC entity among the contention-based Random Access Preamble (as described in subclause 5.1.4).

When DRX is configured, the MAC entity shall:

1> if a MAC PDU is received in a configured downlink assignment:

2> start the drx-HARQ-RTT-TimerDL for the corresponding HARQ process in the first symbol after the end of the corresponding transmission carrying the DL HARQ feedback;

2> stop the drx-RetransmissionTimerDL for the corresponding HARQ process.

1> if a MAC PDU is transmitted in a configured uplink grant:

2> start the drx-HARQ-RTT-TimerUL for the corresponding HARQ process in the first symbol after the end of the first repetition of the corresponding PUSCH transmission;

2> stop the drx-RetransmissionTimerUL for the corresponding HARQ process.

1> if a drx-HARQ-RTT-TimerDL expires:

2> if the data of the corresponding HARQ process was not successfully decoded:

3> start the drx-RetransmissionTimerDL for the corresponding HARQ process in the first symbol after the expiry of drx-HARQ-RTT-TimerDL.

1> if a drx-HARQ-RTT-TimerUL expires:

2> start the drx-RetransmissionTimerUL for the corresponding HARQ process in the first symbol after the expiry of drx-HARQ-RTT-TimerUL.

1> if a DRX Command MAC CE or a Long DRX Command MAC CE is received:

2> stop drx-onDurationTimer;

2> stop drx-InactivityTimer.

1> if drx-InactivityTimer expires or a DRX Command MAC CE is received:

2> if the Short DRX cycle is configured:

3> start or restart drx-ShortCycleTimer in the first symbol after the expiry of drx-InactivityTimer or in the first symbol after the end of DRX Command MAC CE reception;

3> use the Short DRX Cycle.

2> else:

3> use the Long DRX cycle.

1> if drx-ShortCycleTimer expires:

2> use the Long DRX cycle.

1> if a Long DRX Command MAC CE is received:

2> stop drx-ShortCycleTimer;

2> use the Long DRX cycle.

1> if the Short DRX Cycle is used, and [(SFN×10)+subframe number] modulo (drx-ShortCycle)=(drx-StartOffset) modulo (drx-ShortCycle); or 1> if the Long DRX Cycle is used, and [(SFN×10)+subframe number] modulo (drx-LongCycle)=drx-StartOffset:

2> start drx-onDurationTimer after drx-SlotOffset from the beginning of the subframe.

1> if the MAC entity is in Active Time:

2> monitor the PDCCH as specified in TS 38.213 [6];

2> if the PDCCH indicates a DL transmission:

3> start the drx-HARQ-RTT-TimerDL for the corresponding HARQ process in the first symbol after the end of the corresponding transmission carrying the DL HARQ feedback;

3> stop the drx-RetransmissionTimerDL for the corresponding HARQ process.

2> if the PDCCH indicates a UL transmission:

3> start the drx-HARQ-RTT-TimerUL for the corresponding HARQ process in the first symbol after the end of the first repetition of the corresponding PUSCH transmission;

3> stop the drx-RetransmissionTimerUL for the corresponding HARQ process.

2> if the PDCCH indicates a new transmission (DL or UL):

3> start or restart drx-InactivityTimer in the first symbol after the end of the PDCCH reception.

1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this subclause:

2> not transmit periodic SRS and semi-persistent SRS defined in TS 38.214 [7].

1> if CSI masking (csi-Mask) is setup by upper layers:

2> in current symbol n, if onDurationTimer would not be running considering grants/assignments/DRX Command MAC CE/Long DRX Command MAC CE received until 4 ms prior to symbol n when evaluating all DRX Active Time conditions as specified in this subclause:

3> not report CSI on PUCCH.

1> else:

2> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this subclause:

3> not report CSI on PUCCH and semi-persistent CSI on PUSCH.

Regardless of whether the MAC entity is monitoring PDCCH or not, the MAC entity transmits HARQ feedback, aperiodic CSI on PUSCH, and aperiodic SRS defined in TS 38.214 [7] when such is expected.

The MAC entity needs not to monitor the PDCCH if it is not a complete PDCCH occasion (e.g. the Active Time starts or ends in the middle of a PDCCH occasion).

3GPP TS 38.331 specifies the configuration of discontinuous reception as follows:

5.3.5 RRC Reconfiguration 5.3.5.1 General

Figure 6:
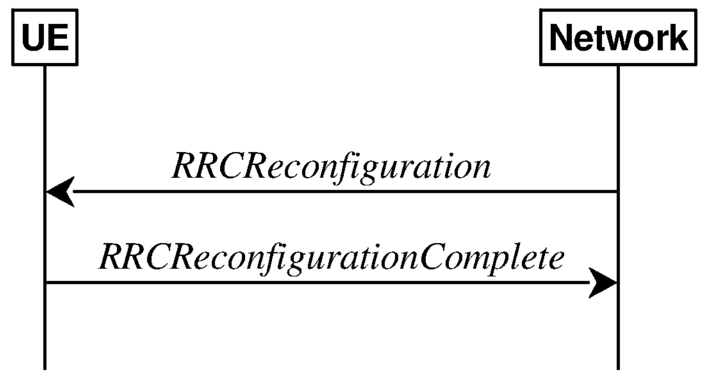
FIG. 6 is a reproduction of FIG. 5.3.5.1-1 of 3GPP TS 38.331 V15.6.0.

[FIG. 5.3.5.1-1 of 3GPP TS 38.331 V15.6.0, Entitled "RRC Reconfiguration, Successful", is Reproduced as FIG. 6]

The purpose of this procedure is to modify an RRC connection, e.g. to establish/modify/release RBs, to perform reconfiguration with sync, to setup/modify/release measurements, to add/modify/release SCells and cell groups. As part of the procedure, NAS dedicated information may be transferred from the Network to the UE.

[ . . . ]

5.3.5.2 Initiation

The Network may initiate the RRC reconfiguration procedure to a UE in RRC_CONNECTED. The Network applies the procedure as follows:

the establishment of RBs (other than SRB1, that is established during RRC connection establishment) is performed only when AS security has been activated;

the addition of Secondary Cell Group and SCells is performed only when AS security has been activated;

the reconfigurationWithSync is included in secondaryCellGroup only when at least one DRB is setup in SCG;

the reconfigurationWithSync is included in masterCellGroup only when AS security has been activated, and SRB2 with at least one DRB are setup and not suspended.

5.3.5.3 Reception of an RRCReconfiguration by the UE

The UE shall perform the following actions upon reception of the RRCReconfiguration:

1> if the RRCReconfiguration is received via other RAT (i.e., inter-RAT handover to NR):

2> if the RRCReconfiguration does not include the fullConfig and the UE is connected to 5GC (i.e., delta signalling during intra 5GC handover):

3> re-use the source RAT SDAP and PDCP configurations if available (i.e., current SDAP/PDCP configurations for all RBs from source E-UTRA RAT prior to the reception of the inter-RAT HO RRCReconfiguration message);

1> else:

2> if the RRCReconfiguration includes the fullConfig:

3> perform the full configuration procedure as specified in 5.3.5.11;

1> if the RRCReconfiguration includes the masterCellGroup:

2> perform the cell group configuration for the received masterCellGroup according to 5.3.5.5;

[ . . . ]

5.3.5.5 Cell Group Configuration 5.3.5.5.1 General

The network configures the UE with Master Cell Group (MCG), and zero or one Secondary Cell Group (SCG). In (NG)EN-DC, the MCG is configured as specified in TS 36.331 [10], and for NE-DC, the SCG is configured as specified in TS 36.331 [10]. The network provides the configuration parameters for a cell group in the CellGroupConfig IE.

The UE performs the following actions based on a received CellGroupConfig 1E:

[ . . . ]

1> if the CellGroupConfig contains the mac-CellGroupConfig:

2> configure the MAC entity of this cell group as specified in 5.3.5.5.5;

[ . . . ]

5.3.5.5.5 MAC Entity Configuration

The UE shall:

[ . . . ]

1> reconfigure the MAC main configuration of the cell group in accordance with the received mac-CellGroupConfig excluding tag-ToReleaseList and tag-ToAddModList;

[ . . . ]

6.2.2 Message Definitions

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3

RLC-SAP: AM

Logical channel: DCCH

Direction: Network to UE

RRCReconfiguration message

```
-- ASN1START
-- TAG-RRCRECONFIGURATION-START
RRCReconfiguration ::=                SEQUENCE {
    rrc-TransactionIdentifier             RRC-TransactionIdentifier,
    criticalExtensions                    CHOICE {
        rrcReconfiguration                    RRCReconfiguration-IEs,
        criticalExtensionsFuture              SEQUENCE { }
    }
}
RRCReconfiguration-IEs ::=            SEQUENCE {
    radioBearerConfig                         RadioBearerConfig
OPTIONAL, -- Need M
    secondaryCellGroup                        OCTET STRING (CONTAINING CellGroupConfig)
OPTIONAL, -- Need M
    measConfig                                MeasConfig
OPTIONAL, -- Need M
    lateNonCriticalExtension                  OCTET STRING
OPTIONAL,
    nonCriticalExtension                      RRCReconfiguration-v1530-IEs
OPTIONAL
}
```

-continued

RRCReconfiguration message

```
RRCReconfiguration-v1530-IEs ::=            SEQUENCE {
    masterCellGroup                         OCTET STRING (CONTAINING CellGroupConfig)
OPTIONAL, -- Need M
    fullConfig                              ENUMERATED {true}
OPTIONAL, -- Cond FullConfig
    dedicatedNAS-MessageList                SEQUENCE (SIZE(1..maxDRB)) OF DedicatedNAS-Message
OPTIONAL, -- Cond nonHO
    masterKeyUpdate                         MasterKeyUpdate
OPTIONAL, -- Cond MasterKeyChange
    dedicatedSIB1-Delivery                  OCTET STRING (CONTAINING SIB1)
OPTIONAL, -- Need N
    dedicatedSystemInformationDelivery      OCTET STRING (CONTAINING SystemInformation)
OPTIONAL, -- Need N
    otherConfig                             OtherConfig
OPTIONAL, -- Need M
    nonCriticalExtension                    RRCReconfiguration-v1540-IEs
OPTIONAL
}
...
-- TAG-RRCRECONFIGURATION-STOP
-- ASN1STOP
```

6.3.2 Radio Resource Control Information Elements

CellGroupConfig

The CellGroupConfig IE is used to configure a master cell group (MCG) or secondary cell group (SCG). A cell group comprises of one MAC entity, a set of logical channels with associated RLC entities and of a primary cell (SpCell) and one or more secondary cells (SCells).

| CellGroupConfig field descriptions |
| --- |
| mac-CellGroupConfig<br>MAC parameters applicable for the entire cell group. |

DRX-Config

The IE DRX-Config is used to configure DRX related parameters.

CellGroupConfig information element

```
-- ASN1START
-- TAG-CELLGROUPCONFIG-START
-- Configuration of one Cell-Group:
CellGroupConfig ::=                 SEQUENCE {
    cellGroupId                         CellGroupId,
    rlc-BearerToAddModList              SEQUENCE (SIZE(1..maxLC-ID)) OF RLC-BearerConfig
OPTIONAL,  -- Need N
    rlc-BearerToReleaseList             SEQUENCE (SIZE(1..maxLC-ID)) OF
LogicalChannelIdentity          OPTIONAL,  -- Need N
    mac-CellGroupConfig                 MAC-CellGroupConfig
OPTIONAL,  -- Need M
    physicalCellGroupConfig             PhysicalCellGroupConfig
OPTIONAL,  -- Need M
    spCellConfig                        SpCellConfig
OPTIONAL,  -- Need M
    sCellToAddModList                   SEQUENCE (SIZE (1..maxNrofSCells)) OF SCellConfig
OPTIONAL,  -- Need N
    sCellToReleaseList                  SEQUENCE (SIZE (1..maxNrofSCells)) OF SCellIndex
OPTIONAL,  -- Need N
    ...,
    [[
    reportUplinkTxDirectCurrent-v1530   ENUMERATED {true}
OPTIONAL    -- Cond BWP-Reconfig
    ]]
}
...
-- TAG-CELLGROUPCONFIG-STOP
-- ASN1STOP
```

DRX-Config information element

```
-- ASN1START
-- TAG-DRX-CONFIG-START
DRX-Config ::=                      SEQUENCE {
    drx-onDurationTimer                 CHOICE {
                                            subMilliSeconds INTEGER (1..31),
                                            milliseconds        ENUMERATED {
                                                ms1, ms2, ms3, ms4, ms5, ms6, ms8, ms10, ms20,
ms30, ms40, ms50, ms60,
                                                ms80, ms100, ms200, ms300, ms400, ms500, ms600,
ms800, ms1000, ms1200,
                                                ms1600, spare8, spare7, spare6, spare5, spare4,
spare3, spare2, spare1 }
                                            },
    drx-InactivityTimer                 ENUMERATED {
                                            ms0, ms1, ms2, ms3, ms4, ms5, ms6, ms8, ms10, ms20,
ms30, ms40, ms50, ms60, ms80,
                                            ms100, ms200, ms300, ms500, ms750, ms1280, ms1920,
ms2560, spare9, spare8,
                                            spare7, spare6, spare5, spare4, spare3, spare2,
spare1},
    drx-HARQ-RTT-TimerDL                INTEGER (0..56),
    drx-HARQ-RTT-TimerUL                INTEGER (0..56),
    drx-RetransmissionTimerDL           ENUMERATED {
                                            sl0, sl1, sl2, sl4, sl6, sl8, sl16, sl24, sl33, sl40
sl64, sl80, sl96, sl112, sl128,
                                            sl160, sl320, spare15, spare14, spare13, spare12,
spare11, spare10, spare9,
                                            spare8, spare7, spare6, spare5, spare4, spare3,
spare2, spare1},
    drx-RetransmissionTimerUL           ENUMERATED {
                                            sl0, sl1, sl2, sl4, sl6, sl8, sl16, sl24, sl33, sl40
sl64, sl80, sl96, sl112, sl128,
                                            sl160, sl320, spare15, spare14, spare13, spare12,
spare11, spare10, spare9,
                                            spare8, spare7, spare6, spare5, spare4, spare3,
spare2, spare1 },
    drx-LongCycleStartOffset            CHOICE {
        ms10                                INTEGER(0..9),
        ms20                                INTEGER(0..19),
        ms32                                INTEGER(0..31),
        ms40                                INTEGER(0..39),
        ms60                                INTEGER(0..59),
        ms64                                INTEGER(0..63),
        ms70                                INTEGER(0..69),
        ms80                                INTEGER(0..79),
        ms128                               INTEGER(0..127),
        ms160                               INTEGER(0..159),
        ms256                               INTEGER(0..255),
        ms320                               INTEGER(0..319),
        ms512                               INTEGER(0..511),
        ms640                               INTEGER(0..639),
        ms1024                              INTEGER(0..1023),
        ms1280                              INTEGER(0..1279),
        ms2048                              INTEGER(0..2047),
        ms2560                              INTEGER(0..2559),
        ms5120                              INTEGER(0..5119),
        ms10240                             INTEGER(0..10239)
    },
    shortDRX                            SEQUENCE {
        drx-ShortCycle                      ENUMERATED {
                                                ms2, ms3, ms4, ms5, ms6, ms7, ms8, ms10, ms14,
ms16, ms20, ms30, ms32,
                                                ms35, ms40, ms64, ms80, ms128, ms160, ms256,
ms320, ms512, ms640, spare9,
                                                spare8, spare7, spare6, spare5, spare4, spare3,
spare2, spare1 },
        drx-ShortCycleTimer                 INTEGER (1..16)
    }
OPTIONAL,   -- Need R
    drx-SlotOffset                      INTEGER (0..31)
}
-- TAG-DRX-CONFIG-STOP
-- ASN1STOP
```

| DRX-Config field descriptions |
|---|
| drx-HARQ-RTT-TimerDL<br>Value in number of symbols of the BWP where the transport block was received.<br>drx-HARQ-RTT-TimerUL<br>Value in number of symbols of the BWP where the transport block was transmitted.<br>drx-InactivityTimer<br>Value in multiple integers of 1 ms. ms0 corresponds to 0, ms1 corresponds to 1 ms, ms2 corresponds to 2 ms, and so on.<br>drx-LongCycleStartOffset<br>drx-LongCycle in ms and drx-StartOffset in multiples of 1 ms. If drx-ShortCycle is configured, the value of drx-LongCycle shall be a multiple of the drx-ShortCycle value.<br>drx-onDurationTimer<br>Value in multiples of 1/32 ms (subMilliSeconds) or in ms (millisecond). For the latter, value ms1 corresponds to 1 ms, value ms2 corresponds to 2 ms, and so on.<br>drx-RetransmissionTimerDL<br>Value in number of slot lengths of the BWP where the transport block was received. value sl0 corresponds to 0 slots, sl1 corresponds to 1 slot, sl2 corresponds to 2 slots, and so on.<br>drx-RetransmissionTimerUL<br>Value in number of slot lengths of the BWP where the transport block was transmitted. sl0 corresponds to 0 slots, sl1 corresponds to 1 slot, sl2 corresponds to 2 slots, and so on.<br>drx-ShortCycleTimer<br>Value in multiples of drx-ShortCycle. A value of 1 corresponds to drx-ShortCycle, a value of 2 corresponds to 2 * drx-ShortCycle and so on.<br>drx-ShortCycle<br>Value in ms. ms1 corresponds to 1 ms, ms2 corresponds to 2 ms, and so on.<br>drx-SlotOffset<br>Value in 1/32 ms. Value 0 corresponds to 0 ms, value 1 corresponds to 1/32 ms, value 2 corresponds to 2/32 ms, and so on. |

MAC-CellGroupConfig

The IE MAC-CellGroupConfig is used to configure MAC parameters for a cell group, including DRX.

MAC-CellGroupConfig information element

```
-- ASN1START
-- TAG-MAC-CELLGROUPCONFIG-START
MAC-CellGroupConfig ::=          SEQUENCE {
      drx-Config                          SetupRelease { DRX-Config }
OPTIONAL,   -- Need M
      schedulingRequestConfig             SchedulingRequestConfig
OPTIONAL,   -- Need M
      bsr-Config                          BSR-Config
OPTIONAL,   -- Need M
      tag-Config                          TAG-Config
OPTIONAL,   -- Need M
      phr-Config                          SetupRelease { PHR-Config }
OPTIONAL,   -- Need M
      skipUplinkTxDynamic                 BOOLEAN,
      ...,
      [[
      csi-Mask                                  BOOLEAN
OPTIONAL,   -- Need M
      dataInactivityTimer                       SetupRelease { DataInactivityTimer }
OPTIONAL    -- Cond MCG-Only
      ]]
}
DataInactivityTimer ::=        ENUMERATED {s1, s2, s3, s5, s7, s10, s15, s20, s40, s50, s60,
s80, s100, s120, s150, s180}
-- TAG-MAC-CELLGROUPCONFIG-STOP
-- ASN1STOP
```

| MAC-CellGroupConfig field descriptions |
|---|
| csi-Mask<br>If set to true, the UE limits CSI reports to the on-duration period of the DRX cycle, see TS 38.321 [3].<br>dataInactivityTimer<br>Releases the RRC connection upon data inactivity as specified in clause 5.3.8.5 and in TS 38.321 |

-continued

| MAC-CellGroupConfig field descriptions |
|---|
| [3]. Value s1 corresponds to 1 second, value s2 corresponds to 2 seconds, and so on.<br>drx-Config<br>Used to configure DRX as specified in TS 38.321 [3].<br>skipUplinkTxDynamic<br>If set to true, the UE skips UL transmissions as described in TS 38.321 [3]. |

As captured in the 3GPP email discussion [108 #44] [V2X] 38.331 running CR (Huawei), one document come out from the 3GPP email discussion on NR sidelink related procedures as follows:

5.3.5 RRC Reconfiguration

<Unrelated Texts Omitted>

5.3.5.3 Reception of an RRCReconfiguration by the UE

The UE shall perform the following actions upon reception of the RRCReconfiguration:

[ . . . ]

1> if the RRCReconfiguration message includes the sl-ConfigDedicatedNR:

2> perform the sidelink dedicated configuration procedure as specified in 5.3.5.X;

1> if the RRCReconfiguration message includes the sl-ConfigDedicatedEUTRA:

2> if sl-V2X-ConfigDedicated is included in sl-ConfigDedicatedEUTRA

3> perform the V2X sidelink communication dedicated configuration procedure as specified in 5.3.10.15a in TS 36.331 [10];

2> if sl-V2X-SPS-Config is included in sl-ConfigDedicatedEUTRA

3> perform V2X sidelink SPS reconfiguration as specified in 5.3.10.5 in TS 36.331 [10];

[ . . . ]

5.7.4 UE Assistance Information 5.7.4.1 General

Figure 7:
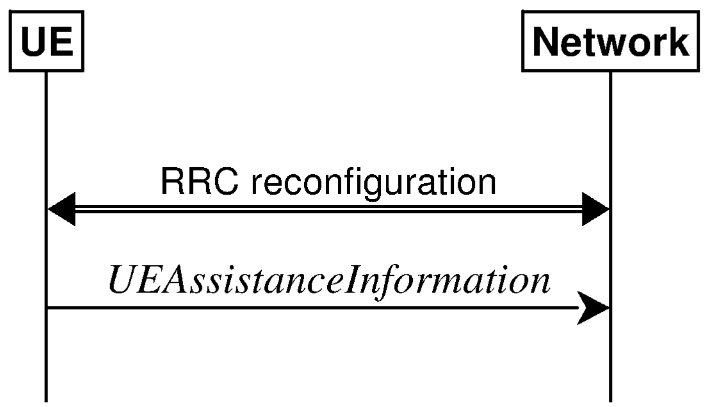
FIG. 7 is a reproduction of FIG. 5.7.4.1-1 of the 3GPP email discussion [108 #44][V2X] 38.331 running CR (Huawei).

[FIG. 5.7.4.1-1 of the 3GPP Email Discussion [108 #44] [V2X] 38.331 Running CR (Huawei), Entitled "UE Assistance Information", is Reproduced as FIG. 7]

The purpose of this procedure is to inform the network of the UE's delay budget report carrying desired increment/decrement in the connected mode DRX cycle length, overheating assistance informationor configured grant assistance information for NR sidelink communication.

5.7.4.2 Initiation

A UE capable of providing delay budget report in RRC_CONNECTED may initiate the procedure in several cases, including upon being configured to provide delay budget report and upon change of delay budget preference.

A UE capable of providing overheating assistance information in RRC_CONNECTED may initiate the procedure if it was configured to do so, upon detecting internal overheating, or upon detecting that it is no longer experiencing an overheating condition.

A UE capable of providing configured grant assistance information for NR sidelink communication in RRC_CONNECTED may initiate the procedure in several cases, including upon being configured to provide traffic pattern information and upon change of traffic pattern.

Upon initiating the procedure, the UE shall:

[ . . . ]

1> if configured to provide configured grant assistance information for NR sidelink communication:

2> initiate transmission of the UEAssistanceInformation message in accordance with 5.7.4.3 to provide configured grant assistance information for NR sidelink communication;

5.7.4.3 Actions Related to Transmission of UEAssistanceInformation Message

The UE shall set the contents of the UEAssistanceInformation message for configured grant assistance information for NR sidelink communication:

1> if configured to provide configured grant assistance information for NR sidelink communication:

2> include the sl-UE-AssistanceInformationNR;

NOTE 1: It is up to UE implementation when and how to trigger configured grant assistance information for NR sidelink communication.

[ . . . ]

5.X.3 Sidelink UE Information for NR Sidelink Communication

5.X.3.1 General

Figure 8:
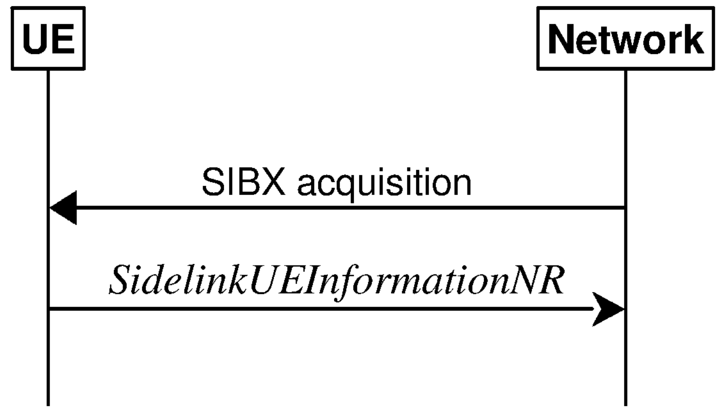
FIG. 8 is a reproduction of FIG. 5.X.3.1-1 of the 3GPP email discussion [108 #44][V2X] 38.331 running CR (Huawei).

[FIG. 5.X.3.1-1 of the 3GPP Email Discussion [108 #44][V2X] 38.331 Running CR (Huawei), entitled "Sidelink UE information for NR sidelink communication", is reproduced as FIG. 8]

The purpose of this procedure is to inform the network that the UE is interested or no longer interested to receive NR sidelink communication, as well as to request assignment or release of transmission resource for NR sidelink communication and to report parameters related to NR sidelink communication.

5.x.3.2 Initiation

A UE capable of NR sidelink communication that is in RRC_CONNECTED may initiate the procedure to indicate it is (interested in) receiving NR sidelink communication in several cases including upon successful connection establishment or resuming, upon change of interest, or upon change to a PCell providing SIBX including sl-ConfigCommonNR. A UE capable of NR sidelink communication may initiate the procedure to request assignment of dedicated resources for NR sidelink communication transmission.

Upon initiating this procedure, the UE shall:

1> if SIBX including sl-ConfigCommonNR is provided by the PCell:

2> ensure having a valid version of SIBX for the PCell;

2> if configured by upper layers to receive NR sidelink communication on the frequency included in sl-FreqInfoList in SIBX of the PCell:

3> if the UE did not transmit a SidelinkUEInformationNR message since last entering RRC_CONNECTED state; or 3> if since the last time the UE transmitted a SidelinkUEInformationNR message the UE connected to a PCell not providing SIBX including sl-ConfigCommonNR; or 3> if the last transmission of the SidelinkUEInformationNR message did not include sl-RxInterestedFreqList; or if the frequency configured by upper layers to receive NR sidelink communication on has changed since the last transmission of the SidelinkUEInformationNR message:

4> initiate transmission of the SidelinkUEInformationNR message to indicate the NR sidelink communication reception frequency of interest in accordance with 5.x.3.3;

2> else:

3> if the last transmission of the SidelinkUEInformationNR message included sl-RxInterestedFreqList:

4> initiate transmission of the SidelinkUEInformationNR message to indicate it is no longer interested in NR sidelink communication reception in accordance with 5.x.3.3;

2> if configured by upper layers to transmit NR sidelink communication on the frequency included in sl-FreqInfoList in SIBX of the PCell:

3> if the UE did not transmit a SidelinkUEInformationNR message since last entering RRC_CONNECTED state; or 3> if since the last time the UE transmitted a SidelinkUEInformationNR message the UE connected to a PCell not providing SIBX including sl-ConfigCommonNR; or 3> if the last transmission of the SidelinkUEInformationNR message did not include sl-TxResourceReqList; or if the information carried by the sl-TxResourceReqList has changed since the last transmission of the SidelinkUEInformationNR message:

4> initiate transmission of the SidelinkUEInformationNR message to indicate the NR sidelink communication transmission resources required by the UE in accordance with 5.X.3.3;

2> else:

3> if the last transmission of the SidelinkUEInformationNR message included sl-TxResourceReqList:

4> initiate transmission of the SidelinkUEInformationNR message to indicate it no longer requires NR sidelink communication transmission resources in accordance with 5.X.3.3.

5.x.3.3 Actions Related to Transmission of SidelinkUEInformationNR Message

The UE shall set the contents of the SidelinkUEInformationNR message as follows:

1> if the UE initiates the procedure to indicate it is (no more) interested to receive NR sidelink communication or to request (configuration/release) of NR sidelink communication transmission resources (i.e. UE includes all concerned information, irrespective of what triggered the procedure):

2> if SIBX including sl-ConfigCommonNR is provided by the PCell:

3> if configured by upper layers to receive NR sidelink communication:

4> include sl-RxInterestedFreqList and set it to the frequency for NR sidelink communication reception;

3> if configured by upper layers to transmit NR sidelink communication:

4> include sl-TxResourceReqList and set its fields (if needed) as follows for each destination for which it requests network to assign NR sidelink communication resource:

5> set sl-DestinationIdentiy to the destination identity configured by upper layer for NR sidelink communication transmission;

5> set sl-CastType to the cast type of the associated destination identity configured by the upper layer for the NR sidelink communication transmission;

5> set sl-RLC-ModeIndication to include the RLC mode(s) and optionally QoS profile(s) of the sidelink QoS flow(s) of the associated RLC mode(s), if the associated bi-directional sidelink DRB addition is due to the configuration by RRCReconfigurationSidelink;

5> set sl-Failure for the associated destination for the NR sidelink communication transmission, if the sidelink RLF is detected;

5> set sl-QoS-InfoList to include QoS profile(s) of the sidelink QoS flow(s) of the associated destination configured by the upper layer for the NR sidelink communication transmission;

5> set sl-InterestedFreqList to indicate the frequency for NR sidelink communication transmission;

5> set sl-TypeTxSyncList to the current synchronization reference type used on the associated sl-InterestedFreqList for NR sidelink communication transmission.

1> The UE shall submit the SidelinkUEInformationNR message to lower layers for transmission.

[ . . . ]

5.X.9 Sidelink RRC Procedure

5.X.9.1 Sidelink RRC Reconfiguration 5.x.9.1.1 General

Figure 9:
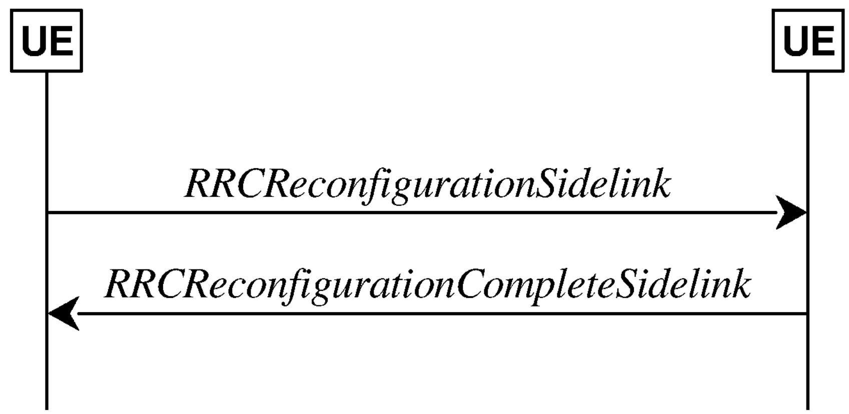
FIG. 9 is a reproduction of FIG. 5.*x*.9.1.1-1 of the 3GPP email discussion [108 #44][V2X] 38.331 running CR (Huawei).

[FIG. 5.*x*.9.1.1-1 of the 3GPP Email Discussion [108 #44][V2X] 38.331 Running CR (Huawei), entitled "Sidelink RRC reconfiguration, successful", is reproduced as FIG. 9]

The purpose of this procedure is to establish/modify/release sidelink DRBs or configure NR sidelink measurement and report for a PC5-RRC connection.

The UE may initiate the sidelink RRC reconfiguration procedure and perform the operation in sub-clause 5.x.9.1.2 to its peer UE in following cases:

the release of sidelink DRBs associated with the peer UE, as specified in sub-clause 5.x.9.1.4;

the establishment of sidelink DRBs associated with the peer UE, as specified in sub-clause 5.x.9.1.5;

the modification for the parameters included in SLRB-Config of sidelink DRBs associated with the peer UE, as specified in sub-clause 5.x.9.1.5;

the configuration of the peer UE to peform NR sidelink measurement and report.

5.x.9.1.2 Actions Related to Transmission of RRCReconfigurationSidelink Message

The UE shall set the contents of RRCReconfigurationSidelink message as follows:

1> for each sidelink DRB that is to be released, according to sub-clause 5.x.9.1.4.1, due to configuration by sl-ConfigDedicatedNR, SIBX, SidelinkPreconfigNR or by upper layers:

2> set the slrb-PC5-ConfigIndex included in the slrb-ConfigToReleaseList corresponding to the sidelink DRB;

1> for each sidelink DRB that is to be established or modified, according to sub-clause 5.x.9.1.5.1, due to receiving sl-ConfigDedicatedNR, SIBX, SidelinkPreconfigNR:

2> set the SLRB-Config included in the slrb-ConfigToAddModList, according to the received sl-RadioBearerConfig and sl-RLC-BearerConfig corresponding to the sidelink DRB;

1> for each NR sidelink measurement and report that is to be configured:

2> set the sl-MeasConfig according to the stored NR sidelink measurement configuration information;

1> start timer T400 for the destination associated with the sidelink DRB;

The UE shall submit the RRCReconfigurationSidelink message to lower layers for transmission.

5.x.9.1.3 Reception of an RRCReconfigurationSidelink by the UE

The UE shall perform the following actions upon reception of the RRCReconfigurationSidelink:

1> if the RRCReconfigurationSidelink includes the slrb-ConfigToReleaseList:

2> for each slrb-PC5-ConfigIndex value included in the slrb-ConfigToReleaseList that is part of the current UE sidelink configuration;

3> perform the sidelink DRB release procedure, according to sub-clause 5.x.9.1.4;

1> if the RRCReconfigurationSidelink includes the slrb-ConfigToAddModList:

2> for each slrb-PC5-ConfigIndex value included in the slrb-ConfigToAddModList that is not part of the current UE sidelink configuration:

3> apply the sl-MappedQoS-FlowsToAddList and sl-MappedQoS-FlowsToReleaseList, if included;

3> perform the sidelink DRB addition procedure, according to sub-clause 5.x.9.1.5;

2> for each slrb-PC5-ConfigIndex value included in the slrb-ConfigToAddModList that is part of the current UE sidelink configuration:

3> apply the sl-MappedQoS-FlowsToAddList and sl-MappedQoS-FlowsToReleaseList, if included;

3> perform the sidelink DRB release or modification procedure, according to sub-clause 5.x.9.1.4 and 5.x.9.1.5.

1> if the UE is unable to comply with (part of) the configuration included in the RRCReconfigurationSidelink (i.e. sidelink RRC reconfiguration failure):

2> continue using the configuration used prior to the reception of the RRCReconfigurationSidelink message;

2> set the content of the RRCReconfigurationFailureSidelink message;

3> submit the RRCReconfigurationFailureSidelink message to lower layers for transmission;

1> else:

2> set the content of the RRCReconfigurationCompleteSidelink message;

3> submit the RRCReconfigurationCompleteSidelink message to lower layers for transmission;

NOTE X: When the same logincal channel is configured with different RLC mode by another UE, the UE handles the case as sidelink RRC reconfiguration failure.

[ . . . ]

5.x.9.1.10 Reception of an RRCReconfigurationCompleteSidelink by the UE

The UE shall perform the following actions upon reception of the RRCReconfigurationCompleteSidelink:

1> stop timer T400, if running;

[ . . . ]

UEAssistanceInformation

The UEAssistanceInformation message is used for the indication of UE assistance information to the network.

Signalling radio bearer: SRB1

RLC-SAP: AM

Logical channel: DCCH

Direction: UE to Network

UEAssistanceInformation Message

```
-- ASN1START
-- TAG-UEASSISTANCEINFORMATION-START
...
UEAssistanceInformation-v1540-IEs ::=     SEQUENCE {
    overheatingAssistance                     OverheatingAssistance              OPTIONAL,
    nonCriticalExtension                      UEAssistanceInformation-v16xy-IEs
OPTIONAL
}
...
UEAssistanceInformation-v16xy-IEs ::=            SEQUENCE {
    sl-UE-AssistanceInformationNR-r16              SL-UE-AssistanceInformationNR-r16
OPTIONAL,
    nonCriticalExtension                           SEQUENCE { }
OPTIONAL
}
SL-UE-AssistanceInformationNR-r16 ::=    SEQUENCE (SIZE (1..maxNrofTrafficPattern-r16)) OF
TrafficPatternInfo-r16
TrafficPatternInfo-r16::= SEQUENCE {
    trafficPeriodicity-r16                  ENUMERATED {
                                                ms20,ms50, ms100, ms200, ms300, ms400, ms500, ms600,
ms700, ms800, ms900, ms1000},
    timingOffset-r16                            INTEGER (0..10239)
OPTIONAL,
    messageSize-r16                             BIT STRING (SIZE (8))
OPTIONAL,
    sl-DestinationIndex-r16                     INTEGER (0..maxNrofSL-Dest-1-r16)
OPTIONAL,
    sl-QoS-FlowIdentity-r16                     SL-QoS-FlowIdentity-r16
OPTIONAL
-- Editor's notes: FFS on QoS info and detailed values for other parameters (For now the values
in LTE are reused).
}
-- TAG-UEASSISTANCEINFORMATION-STOP
-- ASN1STOP
```

| UEAssistanceInformation field descriptions |
|---|
| sl-DestinationIndex<br>Indicates the index of the destination for which the UE is interested to perform NR sidelink communication. The value 0 corresponds to the destination of the first entry in sl-TxResourceReqList in SidelinkUEInformationNR, the value 1 corresponds to the destination of the second entry in sl-TxResourceReqList in SidelinkUEInformationNR and so on. |
| sl-UEAssistanceInformationNR<br>indicates the traffic characteristic of sidelink logical channel(s) that are setup for NR sidelink communication, |
| timingOffset<br>This field indicates the estimated timing for a packet arrival in a SL logical channel. Specifically, the value indicates the timing offset with respect to subframe#0 of SFN#0 in milliseconds. |
| trafficPeriodicity<br>This field indicates the estimated data arrival periodicity in a SL logical channel. Value ms20 corresponds to 20 ms, ms50 corresponds to 50 ms and so on. |
| type1<br>Indicates the preferred amount of increment/decrement to the long DRX cycle length with respect to the current configuration. Value in number of milliseconds. Value ms40 corresponds to 40 milliseconds, msMinus40 corresponds to −40 milliseconds and so on. |

SidelinkUEInformationNR

The SidelinkUEinformationNR message is used for the indication of NR sidelink UE information to the network.

Signalling radio bearer: SRB1

RLC-SAP: AM

Logical channel: DCCH

Direction: UE to Network

SidelinkUEInformationNR message

```
-- ASN1START
-- TAG-SIDELINKUEINFORMATIONNR-START
SidelinkUEInformationNR-r16::=          SEQUENCE {
    criticalExtensions                   CHOICE {
        sidelinkUEInformationNR-r16          SidelinkUEInformationNR-r16-IEs,
        criticalExtensionsFuture             SEQUENCE { }
    }
}
SidelinkUEInformationNR-r16-IEs::=      SEQUENCE {
    sl-RxInterestedFreqList-r16              SL-InterestedFreqList-r16          OPTIONAL,
    sl-TxResourceReqList-r16                 SL-TxResourceReqList-r16           OPTIONAL,
    lateNonCriticalExtension                 OCTET STRING                       OPTIONAL,
    nonCriticalExtension                     SEQUENCE { }                       OPTIONAL
}
SL-InterestedFreqList-r16 ::=               SEQUENCE (SIZE (1..maxNrofFreqSL-r16)) OF INTEGER
(1..maxNrofFreqSL-r16)
SL-TxResourceReqList-r16 ::=            SEQUENCE (SIZE (1..maxNrofSL-Dest-r16)) OF SL-
TxResourceReq-r16
SL-TxResourceReq-r16::=                 SEQUENCE {
    sl-DestinationIdentity-r16               SL-DestinationIdentity-r16,
    sl-CastType-r16                          ENUMERATED {broadcast, groupcast, unicast, spare1},
    sl-RLC-ModeIndication-r16            SEQUENCE {
        sl-AM-Mode-r16                       SEQUENCE {
            sl-AM-Mode-r16                       ENUMERATED {true},
            sl-AM-QoS-InfoList-r16               SEQUENCE (SIZE (1..maxNrofSL-QFIsPerDest-r16)) OF
SL-QoS-Info-r16                     OPTIONAL
        }
OPTIONAL,
        sl-UM-Mode-r16                       SEQUENCE {
            sl-UM-Mode-r16                       ENUMERATED {true},
            sl-UM-QoS-InfoList-r16               SEQUENCE (SIZE (1..maxNrofSL-QFIsPerDest-r16)) OF
SL-QoS-Info-r16                     OPTIONAL
        }
OPTIONAL
    }
OPTIONAL,
    sl-QoS-InfoList-r16                      SEQUENCE (SIZE (1..maxNrofSL-QFIsPerDest-r16)) OF SL-
QoS-Info-r16                         OPTIONAL,
    sl-Failure-r16                           ENUMERATED {true}
OPTIONAL,
    sl-TypeTxSyncList-r16                    SEQUENCE (SIZE (1..maxNrofFreqSL-r16)) OF SL-
TypeTxSync-r16                           OPTIONAL,
    sl-TxInterestedFreqList-r16              SEQUENCE (SIZE (1..maxNrofFreqSL-r16)) OF INTEGER
(1..maxNrofFreqSL-r16)                OPTIONAL
}
SL-QoS-Info-r16 ::=                     SEQUENCE {
    sl-QoS-FlowIdentity-r16                 SL-QoS-FlowIdentity-r16,
    sl-QoS-Profile-r16                      SL-QoS-Profile-r16
OPTIONAL
}
-- TAG-SIDELINKUEINFORMATIONNR-STOP
-- ASN1STOP
```

| SidelinkUEinformationNR field descriptions |
| --- |
| sl-RxInterestedFreqList<br>Indicates the index of frequency on which the UE is interested to receive NR sidelink communication. The value 1 corresponds to the frequency of first entry in sl-FreqInfoList broadcast in SIBX, the value 2 corresponds to the frequency of second entry in sl-FreqInfo-List<br>broadcast in SIBX and so on. In this release, only value 1 can be included in the interested frequency list. |
| sl-TxResourceReq<br>Paramters to request the transmisison resouces for NR sidelink communication to the network in the Sidelink UE Information report. |

| SL-TxResourceReq field descriptions |
|---|
| sl-CastType<br>Indicates the case type for the correponding destination for which to request the resource.<br>sl-DestinationIdentity<br>Indicates the destination for which to request the resource.<br>sl-Failure<br>Indicates the sidelink RLF for the associated destination, when the sidelink RLF is detected. |

| SL-TxResourceReq field descriptions |
|---|
| sl-QoS-InfoList<br>Includes the QoS profile of the sidelink QoS flow as specified in TS 23.287 [xx]<br>sl-QoS-FlowIdentity<br>This identity uniquely identifies one sidelink QoS flow in the scope of UE, which is unique for different destination and cast type.<br>sl-RLC-ModeIndication<br>This field indicates the RLC mode and optionally the related QoS profiles for the sidelink radio bearer, which has not been configured by the network and is initiated by another UE in unicast.<br>sl-TxInterestedFreqList<br>Each entry of this field indicates the index of frequency on which the UE is interested to transmit NR sidelink communication. The value 1 corresponds to the frequency of first entry in sl-FreqInfoList broadcast in SIBX, the value 2 corresponds to the frequency of second entry in sl-FreqInfoList broadcast in SIBX and so on. In this release, only value 1 can be included in the interested frequency list. In this relase, only one entry can be included in the list.<br>sl-TypeTxSyncList<br>A list of synchronization reference used by the UE. The UE shall include the same number of entries, listed in the same order, as in sl-TxInterestedFreqList, i.e. one for each carrier freqeuncy included in sl-TxInterestedFreqList. |

RRCReconfigurationSidelink

The RRCReconfigurationSidelink message is the command to AS configuration of the PC5 RRC connection. It is only applied to unicast of NR sidelink communication.

Signalling radio bearer: Sidelink SRB for PC5-RRC

RLC-SAP: AM

Logical channel: SCCH

Direction: UE to UE

```
-- ASN1START
-- TAG-RRCRECONFIGURATIONSIDELINK-START
RRCReconfigurationSidelink ::=          SEQUENCE {
    rrc-TransactionIdentifier-r16               RRC-TransactionIdentifier,
    criticalExtensions                          CHOICE {
        rrcReconfigurationSidelink-r16              RRCReconfigurationSidelink-IEs-r16,
        criticalExtensionsFuture                    SEQUENCE { }
    }
}
RRCReconfigurationSidelink-IEs-r16 ::=      SEQUENCE {
    slrb-ConfigToAddModList-r16                 SEQUENCE (SIZE (1..maxNrofSLRB-r16)) OF SLRB-
Config-r16                  OPTIONAL,
    slrb-ConfigToReleaseList-r16                SEQUENCE (SIZE (1..maxNrofSLRB-r16)) OF SLRB-
PC5-ConfigIndex-r16         OPTIONAL,
    sl-MeasConfig-r16                           SL-MeasConfig-r16
OPTIONAL,
    sl-CSI-RS-Config-r16                        SL-CSI-RS-Config-r16
OPTIONAL,
    lateNonCriticalExtension                    OCTET STRING
OPTIONAL,
    nonCriticalExtension                        SEQUENCE { }
OPTIONAL
}
SLRB-Config-r16::=                      SEQUENCE {
    slrb-PC5-ConfigIndex-r16            SLRB-PC5-ConfigIndex-r16,
    sl-SDAP-Config-r16                  SL-SDAP-Config-r16
OPTIONAL, -- Need M
    sl-PDCP-Config-r16                  SL-PDCP-Config-r16
OPTIONAL, -- Need N
    sl-RLC-Config-r16                   SL-RLC-Config-r16
OPTIONAL, -- Need N
```

-continued

```
    sl-MAC-LogicalChannelConfig-r16             SL-LogicalChannelConfig-r16
OPTIONAL, -- Need N
    ...
}
SLRB-PC5-ConfigIndex-r16 ::=                    INTEGER (1..maxNrofSLRB-r16)
SL-SDAP-Config-r16 ::=                      SEQUENCE {
    sl-MappedQoS-FlowsToAddList-r16             SEQUENCE (SIZE (1..maxNrofSL-QFIs-r16)) OF SL-
PFI-r16                             OPTIONAL, -- Need M
    sl-MappedQoS-FlowsToReleaseList-16          SEQUENCE (SIZE (1..maxNrofSL-QFIs-r16)) OF SL-
PFI-r16                             OPTIONAL, -- Need N
    ...
}
SL-PDCP-Config-r16 ::=                      SEQUENCE {
    sl-PDCP-SN-Size-r16                         ENUMERATED {len12bits, len18bits}
OPTIONAL, -- Need M
    sl-HeaderCompression-r16                    CHOICE {
                    notUsed-r16                         NULL,
                    rohc-r16                            SEQUENCE {
                    maxCID-r16                          INTEGER (1..16383)
DEFAULT 15
                    }
    },
    ...
}
SL-RLC-Config-r16 ::=                       CHOICE {
    sl-AM-RLC-r16                                   SEQUENCE {
        sl-SN-FieldLengthAM-r16                         SN-FieldLengthAM
OPTIONAL,           -- Need M
    ...
    },
    sl-UM-Bi-Directional-RLC-r16                    SEQUENCE {
        sl-SN-FieldLengthUM-r16                         SN-FieldLengthUM
OPTIONAL,           -- Need M
    ...
    },
    sl-UM-Uni-Directional-RLC-r16                   SEQUENCE {
        sl-SN-FieldLengthUM-r16                         SN-FieldLengthUM
OPTIONAL,           -- Need M
    ...
    }
}
SL-LogicalChannelConfig-r16 ::=             SEQUENCE {
    sl-LogicalChannelIdentity-r16               LogicalChannelIdentity,
    ...
}
SL-PFI-r16 ::=                                  INTEGER (1..64)
SL-CSI-RS-Config-r16 ::=                    SEQUENCE {
    sl-CSI-RS-FreqAllocation-r16                CHOICE {
        sl-OneAntennaPort-r16                       BIT STRING (SIZE (12)),
        sl-TwoAntennaPort-r16                       BIT STRING (SIZE (6))
    }
OPTIONAL, -- Need N
    sl-CSI-RS-FirstSymbol-r16                       INTEGER (FFS)
OPTIONAL, -- Need N
    ...
}
-- TAG-RRCRECONFIGURATIONSIDELINK-STOP
-- ASN1STOP
```

| RRCReconfigurationSidelink field descriptions |
| --- |
| sl-CSI-RS-FreqAllocation<br>Indicates the frequency domain position for sidelink CSI-RS. |
| sl-CSI-RS-FirstSymbol<br>Indicates the position of first symbol of sidelink CSI-RS. |
| sl-LogicalChannelIdentity<br>Indicates the identity of the sidelink logical channel. |
| sl-MappedQoS-FlowsToAddList<br>Indicate the QoS flows to be mapped to the configured SLRB. Each entry is indicated by the SL-PFI, as defined in TS 23.287 [xx]. |
| sl-MappedQoS-FlowsToReleaseList<br>Indicate the QoS flows to be released from the configured SLRB. Each entry is indicated by the SL-PFI, as defined in TS 23.287 [xx]. |

-continued

| RRCReconfigurationSidelink field descriptions |
| --- |
| sl-MeasConfig<br>Indicates the sidelink measurement configuration for the unicast destination. |
| sl-PDCP-SN-Size<br>Indicates the PDCP SN size of the configured SLRB. |
| sl-RLC-Mode<br>Indicates the RLC configurations whichi is asscicated with the configured SLRB. |

RRCReconfigurationCompleteSidelink

The RRCReconfigurationCompleteSidelink message is used to confirm the successful completion of a PC5 RRC AS reconfiguration. It is only applied to unicast of NR sidelink communication.

Signalling radio bearer: Sidelink SRB for PC5-RRC

RLC-SAP: AM

Logical channel: SCCH

Direction: UE to UE

RRCReconfigurationCompleteSidelink message

```
-- ASN1START
-- TAG-RRCRECONFIGURATIONCOMPLETESIDELINK-START
RRCReconfigurationCompleteSidelink ::=          SEQUENCE {
     rrc-TransactionIdentifier-r16                    RRC-TransactionIdentifier,
     criticalExtensions                               CHOICE {
          rrcReconfigurationCompleteSidelink-r16            RRCReconfigurationCompleteSidelink-IEs-
r16,
          criticalExtensionsFuture                          SEQUENCE { }
     }
}
RRCReconfigurationCompleteSidelink-IEs-r16 ::=         SEQUENCE {
-- FFS on the details
     lateNonCriticalExtension                    OCTET STRING
OPTIONAL,
     nonCriticalExtension                        SEQUENCE { }
OPTIONAL
}
-- TAG-RRCRECONFIGURATIONCOMPLETESIDELINK-STOP
-- ASN1STOP
```

3GPP TS 36.300 introduces sidelink as follows:

23.10 Support for Sidelink Communication 23.10.1 General

Sidelink communication is a mode of communication whereby UEs can communicate with each other directly over the PC5 interface, as specified in TS 23.303 [62]. This communication mode is supported when the UE is served by E-UTRAN and when the UE is outside of E-UTRA coverage. Only those UEs authorised to be used for public safety operation can perform sidelink communication.

In order to perform synchronisation for out of coverage operation UE(s) may act as a synchronisation source by transmitting SBCCH and a synchronisation signal. SBCCH carries the most essential system information needed to receive other sidelink channels and signals. SBCCH along with a synchronisation signal is transmitted with a fixed periodicity of 40 ms. When the UE is in network coverage, the contents of SBCCH are derived from the parameters signalled by the eNB. When the UE is out of coverage, if the UE selects another UE as a synchronisation reference, then the content of SBCCH is derived from the received SBCCH; otherwise UE uses pre-configured parameters. SIB18 provides the resource information for synchronisation signal and SBCCH transmission. There are two pre-configured subframes every 40 ms for out of coverage operation. UE receives synchronisation signal and SBCCH in one subframe and transmit synchronisation signal and SBCCH on another subframe if UE becomes synchronisation source based on defined criterion, as specified in [16].

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order in case Sidelink Discovery Gap is not configured:

- Uu transmission/reception (highest priority);
- PC5 sidelink communication transmission/reception;
- PC5 sidelink discovery announcement/monitoring (lowest priority).

The UE performs transmission and reception over Uu and PC5 with the following decreasing priority order in case Sidelink Discovery Gap is configured:

- Uu transmission/reception for RACH;
- PC5 sidelink discovery announcement during a Sidelink Discovery Gap for transmission;
- Non-RACH Uu transmission;
- PC5 sidelink discovery monitoring during a Sidelink Discovery Gap for reception;
- Non-RACH Uu reception;
- PC5 sidelink communication transmission/reception.

23.10.2 Radio Protocol Architecture 23.10.2.0 General

In this clause, the UE radio protocol architecture for sidelink communication is given for the user plane and the control plane.

23.10.2.1 User Plane

FIG. 23.10.2.1-1 shows the protocol stack for the user plane, where PDCP, RLC and MAC sublayers (terminate at the other UE) perform the functions listed for the user plane in clause 6.

The Access Stratum protocol stack in the PC5 interface consists of PDCP, RLC, MAC and PHY as shown below in FIG. 23.10.2.1-1.

Figure 10:
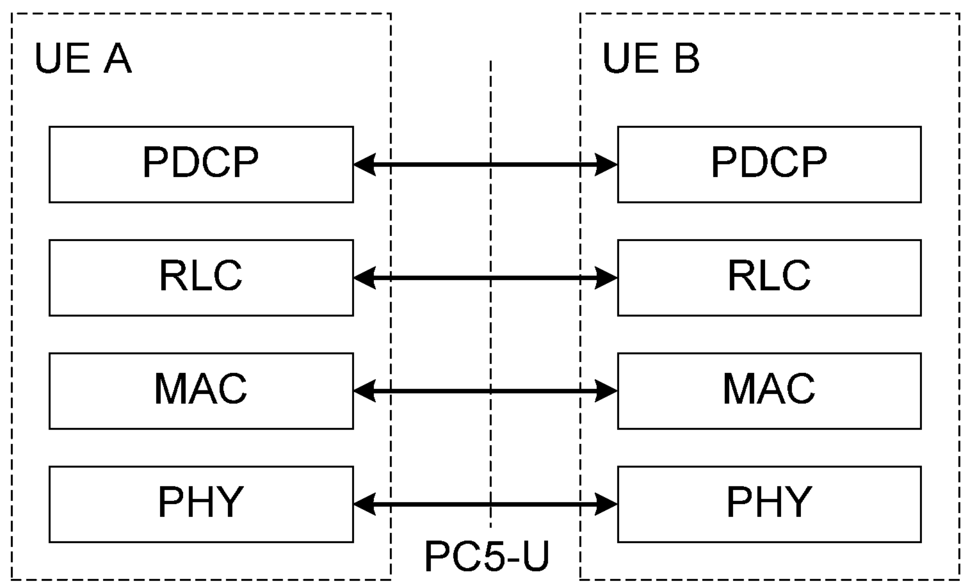
FIG. 10 is a reproduction of FIG. 23.10.2.1-1 of 3GPP TS 36.300 V16.0.0.

FIG. 23.10.2.1-1 of 3GPP TS 36.300 V16.0.0, Entitled "User-Plane Protocol Stack for Sidelink Communication", is Reproduced as FIG. 10

User plane details of sidelink communication:

There is no HARQ feedback for sidelink communication;

RLC UM is used for sidelink communication;

A receiving UE needs to maintain at least one RLC UM entity per transmitting peer UE;

A receiving RLC UM entity used for sidelink communication does not need to be configured prior to reception of the first RLC UMD PDU;

ROHC Unidirectional Mode is used for header compression in PDCP for sidelink communication;

UDC is not used for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

23.10.2.2 Control Plane

A UE does not establish and maintain a logical connection to receiving UEs prior to one-to-many a sidelink communication. Higher layer establishes and maintains a logical connection for one-to-one sidelink communication including ProSe UE-to-Network Relay operation.

The Access Stratum protocol stack for SBCCH in the PC5 interface consists of RRC, RLC, MAC and PHY as shown below in FIG. 23.10.2.2-1.

FIG. 23.10.2.2-1 of 3GPP TS 36.300 V16.0.0, Entitled "Control-Plane Protocol Stack for SBCCH", is Reproduced as FIG. 11

The control plane for establishing, maintaining and releasing the logical connection for one-to-one sidelink communication is shown in FIG. 23.10.2.2-2.

Figure 12:
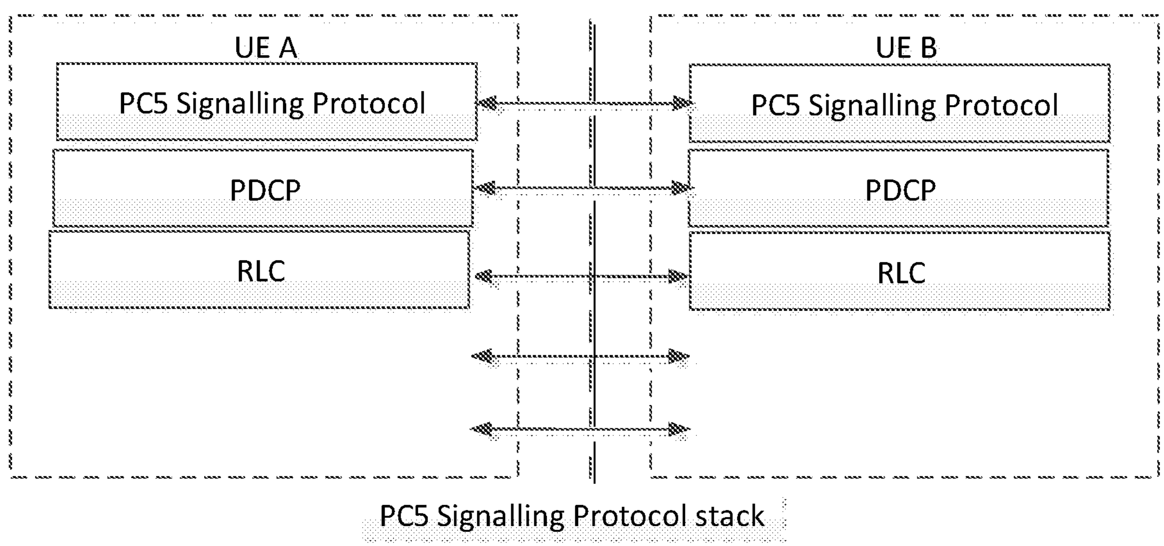
FIG. 12 is a reproduction of FIG. 23.10.2.2-2 of 3GPP TS 36.300 V16.0.0.

FIG. 23.10.2.2-2 of 3GPP TS 36.300 V16.0.0, Entitled "Control-Plane Protocol Stack for One-to-One Sidelink Communication", is Reproduced as FIG. 12]

23.14 Support for V2X Services 23.14.1 General 23.14.1.0 Overview

Vehicular communication services, represented by V2X services, can consist of the following four different types: V2V, V2I, V2N and V2P, as specified in TS 22.185 [71].

V2X services can be provided by PC5 interface and/or Uu interface. Support of V2X services via PC5 interface is provided by V2X sidelink communication, which is a mode of communication whereby UEs can communicate with each other directly over the PC5 interface, as specified in TS 23.303 [62]. This communication mode is supported when the UE is served by E-UTRAN and when the UE is outside of E-UTRA coverage. Only the UEs authorised to be used for V2X services can perform V2X sidelink communication.

23.14.1.1 Support for V2X Sidelink Communication

The user plane protocol stack and functions, as specified in clause 23.10.2.1 for sidelink communication, are also used for V2X sidelink communication. In addition, for V2X sidelink communication:

STCH for sidelink communication is also used for V2X sidelink communication.

Non-V2X (e.g. Public Safety) data is not multiplexed with V2X data transmitted in resources configured for V2X sidelink communication.

The Access Stratum (AS) is provided with the PPPP and PPPR of a protocol data unit transmitted over PC5 interface by upper layers. The packet delay budget (PDB) of the protocol data unit can be determined from the PPPP. The low PDB is mapped to the high priority PPPP value (TS 23.285 [72]).

The Access Stratum (AS) is provided with a transmit profile (TS 23.285 [72]) of a protocol data unit transmitted over PC5 interface by upper layers.

The logical channel prioritization based on PPPP is used for V2X sidelink communication.

Control plane protocol stack for SBCCH as specified in clause 23.10.2.2 for sidelink communication is also used for V2X sidelink communication.

The UE supporting V2X sidelink communication can operate in two modes for resource allocation:

Scheduled resource allocation, characterized by:

The UE needs to be RRC_CONNECTED in order to transmit data;

The UE requests transmission resources from the eNB. The eNB schedules transmission resources for transmission of sidelink control information and data. Sidelink SPS is supported for scheduled resource allocation;

UE autonomous resource selection, characterized by:

The UE on its own selects resources from resource pools and performs transport format selection to transmit sidelink control information and data;

If mapping between the zones and V2X sidelink transmission resource pools is configured, the UE selects V2X sidelink resource pool based on the zone UE is located in.

The UE performs sensing for (re)selection of sidelink resources. Based on sensing results, the UE (re) selects some specific sidelink resources and reserves multiple sidelink resources. Up to 2 parallel independent resource reservation processes are allowed to be performed by the UE. The UE is also allowed to perform a single resource selection for its V2X sidelink transmission.

[ . . . ]

An RRC_CONNECTED UE may send a Sidelink UE Information message to the serving cell if it is interested in V2X sidelink communication transmission in order to request sidelink resources.

If the UE is configured by upper layers to receive V2X sidelink communication and V2X sidelink reception resource pools are provided, the UE receives on those provided resources.

[ . . . ]

For sidelink SPS, maximum 8 SPS configurations with different parameters can be configured by eNB and all SPS configurations can be active at the same time. The activation/deactivation of SPS configuration is signalled via PDCCH by eNB. The existing logical channel prioritization based on PPPP is used for sidelink SPS.

UE assistance information can be provided to eNB. Reporting of UE assistance information is configured by eNB for V2X sidelink communication. The UE assistance information used for V2X sidelink communication includes traffic characteristic parameters (e.g. a set of preferred SPS interval, timing offset with respect to subframe 0 of the SFN 0, PPPP, PPPR, Destination Layer-2 ID, and maximum TB size based on observed traffic pattern) related to the SPS configuration. The UE assistance information can be reported in case either SPS is already configured or not.

Triggering of UE assistance information transmission is left to UE implementation. For instance, the UE is allowed to report UE assistance information when change in estimated periodicity and/or timing offset of packet arrival occurs. SR mask per traffic type is not supported for V2X sidelink communication.

3GPP TS 23.287 introduces authorization and provisioning for V2X communications as follows:

5.1 Authorization and Provisioning for V2X Communications 5.1.1 General

In 5GS, the parameters for V2X communications over PC5 and Uu reference points may be made available to the UE in following ways:

pre-configured in the ME; or configured in the UICC; or preconfigured in the ME and configured in the UICC; or provided/updated by the V2X Application Server via PCF and/or V1 reference point; or provided/updated by the PCF to the UE.

If the same set(s) of parameters described in clauses 5.1.2.1 and 5.1.3.1 are provided by different sources, the UE shall consider them in the following priority order:

provided/updated by the PCF;

provided/updated by the V2X Application Server via V1 reference point;

configured in the UICC;

pre-configured in the ME.

The basic principles of service authorization and provisioning for V2X communication over PC5 reference point and provisioning for V2X communication over Uu reference point are:

The UE may be authorized to use V2X communication over PC5 reference point on a per PLMN basis by the PCF in the HPLMN.

The PCF in the HPLMN merges authorization information from home and other PLMNs and provides the UE with the final authorization information.

The PCF in the VPLMN or HPLMN may revoke the authorization (via H-PCF when roaming) at any time by using the UE Configuration Update procedure for transparent UE Policy delivery procedure defined in clause 4.2.4.3 of TS 23.502 [7].

The provisioning to UE for V2X communication over PC5 and Uu reference points is controlled by the PCF and may be triggered by UE. The PCF includes the V2X Policy/parameters for V2X communications over PC5 reference point as specified in clause 5.1.2.1 and/or the V2X Policy/parameters for V2X communications over Uu reference point as specified in clause 5.1.3.1 into a Policy Section identified by a Policy Section Identifier (PSI) as specified in clause 6.1.2.2.2 of TS 23.503 [16].

5.1.2 Authorization and Provisioning for V2X Communications Over PC5 Reference Point

5.1.2.1 Policy/Parameter Provisioning

The following sets of information for V2X communications over PC5 reference point is provisioned to the UE:

1) Authorization policy:

When the UE is "served by E-UTRA" or "served by NR":

PLMNs in which the UE is authorized to perform V2X communications over PC5 reference point when "served by E-UTRA" or "served by NR".

For each above PLMN:

RAT(s) over which the UE is authorized to perform V2X communications over PC5 reference point.

When the UE is "not served by E-UTRA" and "not served by NR":

Indicates whether the UE is authorized to perform V2X communications over PC5 reference point when "not served by E-UTRA" and "not served by NR".

RAT(s) over which the UE is authorized to perform V2X communications over PC5 reference point.

2) Radio parameters when the UE is "not served by E-UTRA" and "not served by NR":

Includes the radio parameters per PC5 RAT (i.e. LTE PC5, NR PC5) with Geographical Area(s) and an indication of whether they are "operator managed" or "non-operator managed". The UE uses the radio parameters to perform V2X communications over PC5 reference point when "not served by E-UTRA" and "not served by NR" only if the UE can reliably locate itself in the corresponding Geographical Area. Otherwise, the UE is not authorized to transmit.

Editor's note: The radio parameters (e.g. frequency bands) are to be defined by RAN WGs. The reference to RAN specification will be added when defined in RAN WGs.

NOTE 1: Whether a frequency band is "operator managed" or "non-operator managed" in a given Geographical Area is defined by local regulations.

3) Policy/parameters per RAT for PC5 Tx Profile selection:

The mapping of V2X service types (e.g. PSIDs or ITS-AIDS) to Tx Profiles.

Editor's note: The Tx Profiles are to be defined by RAN WGs. The reference to RAN specification will be added when defined in RAN WGs.

4) Policy/parameters related to privacy:

The list of V2X service types, e.g. PSIDs or ITS-AIDS of the V2X applications, with Geographical Area(s) that require privacy support.

5) Policy/parameters when LTE PC5 is selected:

Same as specified in TS 23.285 [8] clause 4.4.1.1.2 item 3) Policy/parameters except for the mapping of V2X service types to Tx Profiles and the list of V2X services with Geographical Area(s) that require privacy support.

6) Policy/parameters when NR PC5 is selected:

The mapping of V2X service types (e.g. PSIDs or ITS-AIDS) to V2X frequencies with Geographical Area(s).

The mapping of Destination Layer-2 ID(s) and the V2X service types, e.g. PSIDs or ITS-AIDs of the V2X application for broadcast.

The mapping of Destination Layer-2 ID(s) and the V2X service types, e.g. PSIDs or ITS-AIDs of the V2X application for groupcast.

The mapping of default Destination Layer-2 ID(s) for initial signalling to establish unicast connection and the V2X service types, e.g. PSIDs or ITS-AIDS of the V2X application.

NOTE 2: The same default Destination Layer-2 ID for unicast initial signalling can be mapped to more than one V2X service types. In the case where different V2X services are mapped to distinct default Destination Layer-2 IDs, when the UE intends to establish a single unicast link that can be used for more than one V2X service types, the UE can select any of the default Destination Layer-2 IDs to use for the initial signalling.

PC5 QoS mapping configuration:

Input from V2X application layer:

V2X service type (e.g. PSID or ITS-AID).

(Optional) V2X Application Requirements for the V2X service type, e.g. priority requirement, reliability requirement, delay requirement, range requirement.

NOTE 3: Details of V2X Application Requirements for the V2X service type is up to implementation and out of scope of this specification.

Output:

PC5 QoS parameters defined in clause 5.4.2 (i.e. PQI and conditionally other parameters such as MFBR/GFBR, etc).

SLRB configurations, i.e. the mapping of PC5 QoS profile(s) to SLRB(s), when the UE is "not served by E-UTRA" and "not served by NR".

The PC5 QoS profile contains PC5 QoS parameters described in clause 5.4.2, and value for the QoS characteristics regarding Priority Level, Averaging Window, Maximum Data Burst Volume if default value is not used as defined in Table 5.4.4-1.

7) Validity timer indicating the expiration time of the V2X Policy/Parameter.

Editor's note: The SLRB configurations will be determined by RAN WGs. The reference to RAN specification will be added when defined in RAN WGs.

Editor's note: For the PC5 QoS profile, coordination with RAN WGs is needed.

Editor's note: The V2X frequencies with Geographical Area(s) will be determined by RAN WGs. The reference to RAN specification will be added when defined in RAN WGs.

The above parameter sets from bullet 2) to 6) may be configured in the UE through the V1 reference point by the V2X Application Server.

According to 3GPP TS 38.300, NR Uu specified one mechanism for saving UE power on monitoring downlink control channel (e.g. PDCCH). If a UE is configured with discontinuous reception (DRX) by its serving base station (e.g. gNB), the UE does not have to continuously monitor the downlink control channel. Basically, DRX mechanism is characterized by following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity; and active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

According to 3GPP RP-193231, Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized. In general, DRX mechanism operates periodic repetition of on-duration followed by inactivity period. Therefore, DRX mechanism is applicable for reception of periodic traffic.

In Uu, DRX wake-up time is determined based on system frame number and subframe number which are synced between UE and gNB. When operating sidelink DRX mechanism, the timing to wake up for monitoring sidelink control channel could be synced with a synchronization reference UE. For example, UE1 and UE2 communicate each other. UE2 monitors sidelink synchronization signal (e.g. MasterInformationBlockSidelink) sent by UE1 if UE1 is a synchronization reference UE. In the sidelink synchronization signal, information about frame number (e.g. directFrameNumber) and time slot (e.g. slotIndex) used to send this sidelink synchronization signal could be included so that frame number and time slot of UE2 can be synced with frame number and time slot of UE1. With the synced frame number and time slot, UE2 can know when to wake up for monitoring sidelink control channel while UE1 can know when UE2 will try to receive sidelink control information on the sidelink control channel based on the same sidelink DRX configuration known by each other.

Basically, UE1 must transmit sidelink packets to UE2 at the period on which UE2 is awake for receiving these sidelink packets. Otherwise, these sidelink packets may be lost if UE1 transmits these sidelink packets while UE2 is on the "sleep" period. Therefore, UE1 must know when UE2 will wake up if UE2 operates DRX mechanism on sidelink or PC5 interface. Furthermore, UE1 may also need to know how long UE2 stays awake after waking up. In addition, UE2 may also connect to a serving base station (e.g. gNB) for transmitting or receiving traffic to or from the gNB via Uu interface while it is communicating with UE1 via sidelink or PC5 interface. It is possible that UE2 is also configured with Uu DRX mechanism by the gNB. Similarly, UE2 can save power on the "sleep" period on which it does not monitor PDCCH. It is beneficial to maximize the power saving if it maximizes overlap between both sidelink DRX wake-up time and Uu DRX wake-up time. Following discuss some potential methods to address alignment of sidelink DRX wake-up time between UEs and alignment of sidelink DRX wake-up time and Uu DRX wake-up time between UE and gNB.

If UE1 is configured by gNB1 with network scheduling mode of resource allocation for sidelink transmission, UE1 receives downlink control information for a sidelink grant from gNB1 and follows the downlink control information to perform sidelink transmission(s) using the sidelink grant to UE2 at specific time (i.e. time to perform the sidelink transmission is associated with time to receive the downlink control information and/or time gap indicated in the downlink control information). Since gNB1 does not know when UE2 will wake up for sidelink reception, gNB1 cannot properly allocate UE1 with a sidelink grant and/or sidelink resources for sidelink transmission(s) at the right time for UE1 to perform sidelink transmission just in time UE2 is on-duration. Therefore, gNB1 serving UE1 should know wake-up time of UE2.

Figure 13:
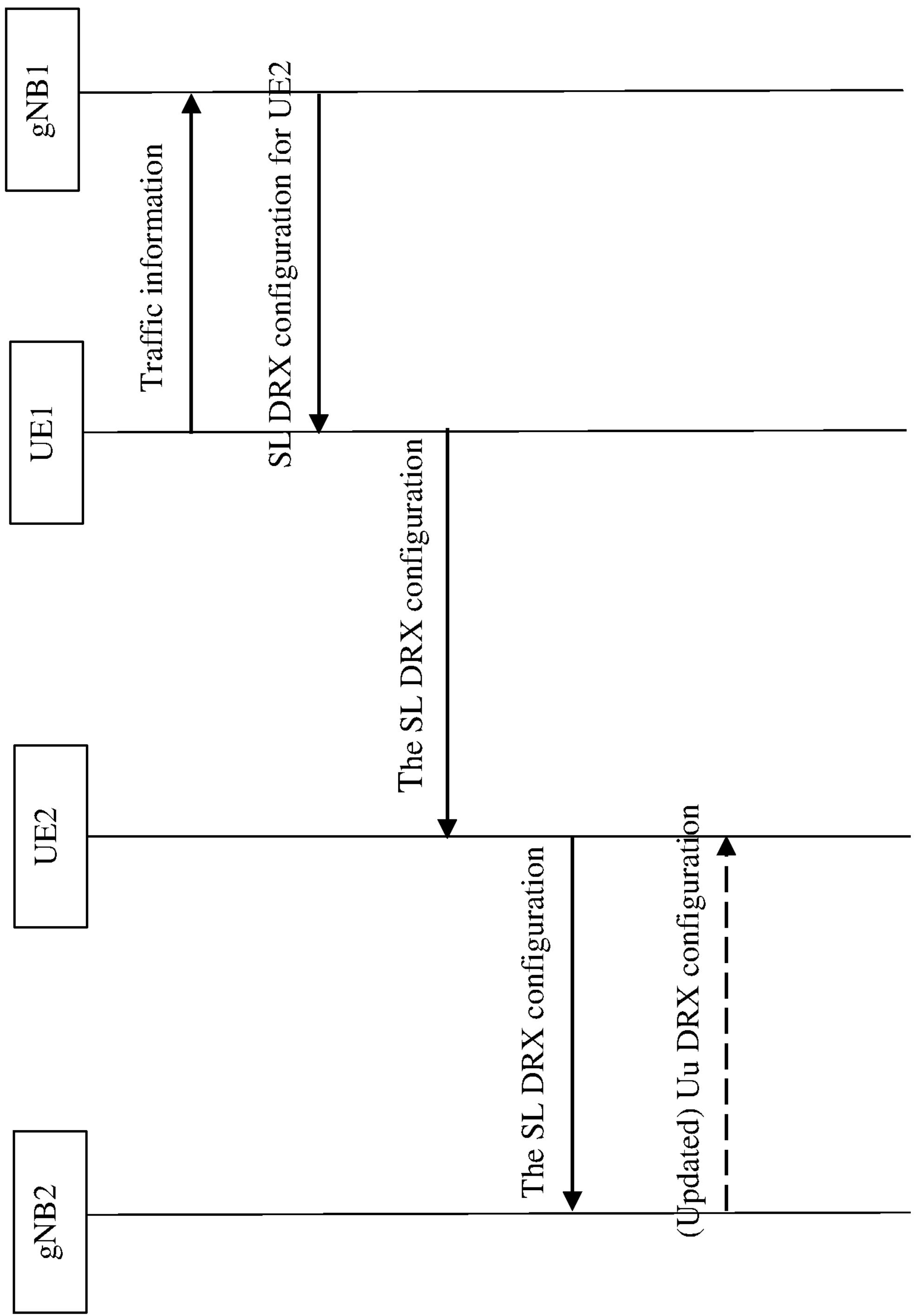
FIG. 13 illustrates an example where UE2's DRX is determined by gNB1 for unicast sidelink communication according to one exemplary embodiment.

One alternative is generally that gNB1 can determine wake-up time and UE2 follows the wake-up time. Basically, if UE1 has traffic for sidelink transmission, UE1 needs to report sidelink QoS flow or profile of the traffic to gNB1. Furthermore, UE1 could also report traffic pattern of the traffic to gNB1. With these reported traffic information, gNB1 could determine a sidelink DRX configuration for UE2 to comply with. gNB1 could transmit the sidelink DRX configuration of UE2 to UE1. And then, UE1 provides the sidelink DRX configuration to UE2. By this way, UE1 can know when UE2 will wake up based on the sidelink DRX configuration. Meanwhile, gNB1 will be able to allocate UE1 with sidelink grant and/or sidelink resources for sidelink transmission(s) at the right time since gNB1 can know when UE2 will wake up based on the sidelink DRX configuration. Possibly, UE2 could report its sidelink wake-up time or the sidelink DRX configuration (provided by gNB1) to gNB2. Therefore, gNB2 can configure or reconfiguration UE2 with proper Uu DRX configuration so that Uu wake-up time could be aligned with sidelink wake-up time on UE2 for saving more power. This alternative could be illustrated in FIG. 13, which shows an example where UE2's DRX is determined by gNB1 for unicast sidelink communication.

More specifically, the sidelink Quality of Service (QoS) flow or profile and the traffic pattern could be reported to gNB1 via separate Radio Resource Control (RRC) messages. For example, the sidelink QoS flow or profile could be reported via SidelinkUEInformationNR, and the traffic pattern could be reported via UEAssistanceInformation. Furthermore, the sidelink QoS flow or profile and the traffic pattern could be reported to gNB1 via the same RRC message (e.g. SidelinkUEInformationNR or UEAssistanceInformation).

More specifically, gNB1 could provide UE1 with the sidelink DRX configuration for UE2 via a RRC message (e.g. RRCReconfiguration). UE1 could provide the sidelink DRX configuration to UE2 via a PC5 RRC message (e.g. RRCReconfigurationSidelink). In response to reception of the PC5 RRC message from UE1, UE2 could respond UE1 with a complete message (e.g. RRCReconfigurationCompleteSidelink).

More specifically, UE2 could report the sidelink DRX configuration or sidelink wake-up time derived from the sidelink DRX configuration to gNB2 via a RRC message (e.g. SidelinkUEInformationNR or UEAssistanceInformation). gNB2 could provide UE2 with the (updated) Uu DRX configuration of UE2 via a RRC message (e.g. RRCReconfiguration).

Alternatively, gNB2 could determine sidelink DRX configuration for UE2 and gNB1 can be informed with the sidelink DRX configuration. Possibly, UE2 could observe reception interval between each received sidelink packet from UE1 so that UE2 could derive a traffic pattern of UE1 or a preferred sidelink DRX configuration fitting the traffic pattern. It is also possible that UE2 could be provided with traffic pattern information by UE1 via e.g. PC5 RRC message. UE2 could report information about the traffic pattern or the preferred sidelink DRX configuration to gNB2. And then, gNB2 provide a sidelink DRX configuration to UE2. In order for UE1 to know UE2 will operate sidelink DRX mechanism, UE2 could provide the sidelink DRX configuration to UE1 via e.g. PC5 RRC message. It is also possible that UE2 could provide information of SL on-duration pattern derived from the sidelink DRX configuration to UE1 via e.g. PC5 RRC message. Therefore, UE1 can know when UE2 will wake up.

Figure 14:
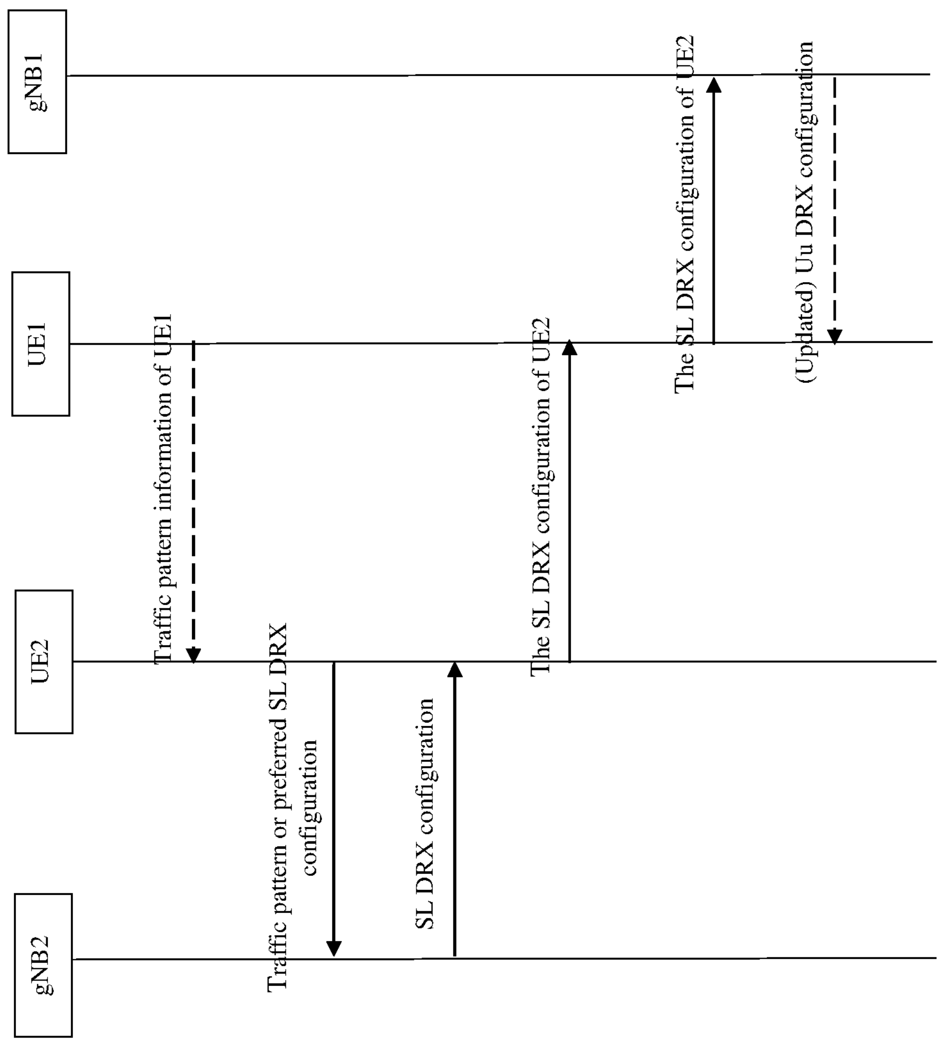
FIG. 14 illustrates an example where UE2's DRX is determined by gNB2 for unicast sidelink communication according to one exemplary embodiment.

In order for gNB1 to know when the sidelink wake-up time of UE2, UE1 could report UE2's sidelink wake-up time or the sidelink DRX configuration to gNB1. Based on the reported sidelink wake-up time or sidelink DRX configuration, gNB1 will be able to allocate UE1 with sidelink grant and/or sidelink resources for sidelink transmission(s) at the right time. Thus, UE1 will perform sidelink transmission to UE2 and/or receive from UE2 a feedback (e.g. HARQ ACK or NACK) associated with a sidelink transmission to UE2 at a period of UE2's sidelink wake-up time based on a sidelink grant or sidelink resources indicated by the sidelink grant. In addition, with the reported sidelink wake-up time or sidelink DRX configuration, gNB1 also can configure or reconfigure Uu DRX configuration (to align Uu wake-up time with sidelink wake-up time) on UE1 if needed. On the other hand, when gNB2 provides the sidelink DRX configuration to UE2, gNB2 can also configure or reconfigure Uu DRX configuration (to align Uu wake-up time with sidelink wake-up time) on UE2. It is also possible that gNB2 could configure the Uu DRX configuration after providing the sidelink DRX configuration to UE2 when needed. This alternative could be illustrated in FIG. 14, which shows an example where UE2's DRX is determined by gNB2 for unicast sidelink communication.

More specifically, the PC5 RRC message could include Sidelink Radio Bearer (SLRB) configuration (including, for example, Service Data Adaptation Protocol (SDAP) configuration Packet Data Convergence Protocol (PDCP) configuration, Radio Link Control (RLC) configuration, and/or logical channel configuration). The PC5 RRC message may also include one or more identities of sidelink QoS flows and/or sidelink QoS profiles associated with these sidelink QoS flows.

More specifically, the PC5 RRC message could be RRCReconfigurationSidelink. In response to reception of the PC5 RRC message including the traffic pattern information, UE2 could respond a complete PC5 RRC message to UE1. In response to reception of the PC5 RRC message including the sidelink DRX configuration or the information of SL on-duration pattern, UE1 could respond a complete PC5 RRC message to UE2. The complete PC5 RRC message could be RRCReconfigurationCompleteSidelink.

More specifically, the traffic pattern information can indicate when UE1 will perform sidelink (periodic) transmissions to UE2.

More specifically, UE2 could report the traffic pattern or the preferred sidelink DRX configuration to gNB2 via one RRC message (e.g. SidelinkUEInformationNR or UEAssistanceInformation). gNB2 could provide the sidelink DRX configuration to UE2 via one RRC message (e.g. RRCReconfiguration).

More specifically, UE2 could provide the sidelink DRX configuration or the information of SL on-duration pattern to UE1 via one PC5 RRC message. This PC5 RRC message could be the complete PC5 RRC message corresponding to the PC5 RRC message including the traffic pattern information (e.g. RRCReconfigurationCompleteSidelink) or another PC5 RRC message (e.g. RRCReconfigurationSidelink).

More specifically, UE1 could report the sidelink DRX configuration of UE2 to gNB1 via one RRC message (e.g. SidelinkUEInformationNR or UEAssistanceInformation). gNB1 could provide the (updated) Uu DRX configuration of UE1 to UE1 via one RRC message (e.g. RRCReconfiguration). gNB2 could provide the (updated) Uu DRX configuration of UE2 to UE2 via one RRC message (e.g. RRCReconfiguration).

Figure 15:
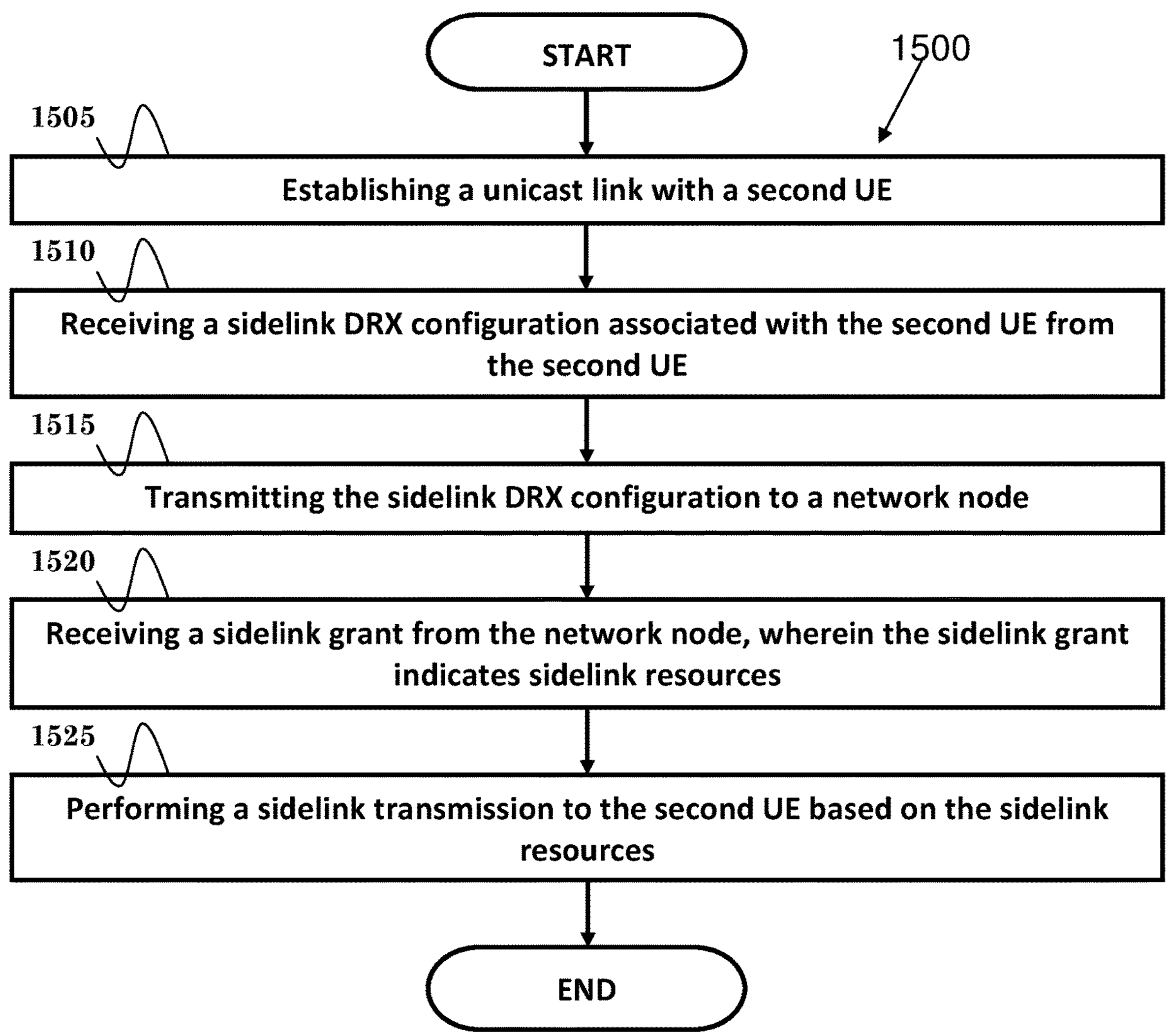
FIG. 15 is a flow chart according to one exemplary embodiment.

FIG. 15 is a flow chart 1500 according to one exemplary embodiment from the perspective of a first UE to support SL DRX. In step 1505, the first UE establishes a unicast link with a second UE. In step 1510, the first UE receives a SL DRX configuration associated with the second UE from the second UE. In step 1515, the first UE transmits the sidelink DRX configuration to a network node. In step 1520, the first UE receives a sidelink grant from the network node, wherein the sidelink grant indicates sidelink resources. In step 1525, the first UE performs a sidelink transmission to the second UE based on the sidelink resources.

In one embodiment, the first UE could be a transmitting UE, and the second UE could be a receiving UE. The first UE could transmit a Radio Resource Control (RRC) message for providing the SL DRX configuration of the second UE to the network node. The RRC message could be a SidelinkUEInformationNR message. The SL DRX configuration may include parameters used to control the period of the second UE monitoring sidelink control channel.

In one embodiment, the SL DRX configuration could configure at least one of an on-duration timer (e.g. drx-onDurationTimerSL) used for determining a duration at the beginning of a SL DRX cycle, a slot offset (e.g. drx-SlotOffsetSL) used for determining a delay before starting the on-duration timer, an inactive timer (e.g. drx-InactivityTimerSL) used for determining a duration after a PSCCH occasion in which a sidelink control information indicates a sidelink transmission, a retransmission timer (e.g. drx-RetransmissionTimerSL) used for determining a maximum duration until a sidelink retransmission is received, a cycle length (e.g. drx-LongCycleStartOffsetSL) used for determining a length of the SL DRX cycle, a short cycle length (e.g. drx-ShortCycleSL) used for determining a length of a second SL DRX cycle shorter than the length of the SL DRX cycle, a cycle start offset (e.g. drx-StartOffset) used for determining a subframe where the SL DRX cycle starts, and/or a round trip-time timer (e.g. drx-HARQ-RTT-TimerSL) used for determining a maximum duration before a sidelink HARQ retransmission grant is expected.

In one embodiment, the network node could be a base station (e.g. gNB).

In one embodiment, the first UE could receive a feedback (e.g., HARQ feedback) associated with the sidelink transmission from the second UE. The feedback may be a HARQ positive acknowledgement or a HARQ negative acknowledgement.

Referring back to FIGS. 3 and 4, in one exemplary embodiment of a first UE to support SL DRX. The first UE 300 includes a program code 312 stored in the memory 310. The CPU 308 could execute program code 312 to enable the first UE (i) to establish a unicast link with a second UE, (ii) to receive a sidelink DRX configuration associated with the second UE from the second UE, (iii) to transmit the sidelink DRX configuration to a network node, (iv) to receive a sidelink grant from the network node, wherein the sidelink grant indicates sidelink resources, and (v) to perform a sidelink transmission to the second UE based on the sidelink resources. Furthermore, the CPU 308 can execute the program code 312 to perform all of the above-described actions and steps or others described herein.

Figure 16:
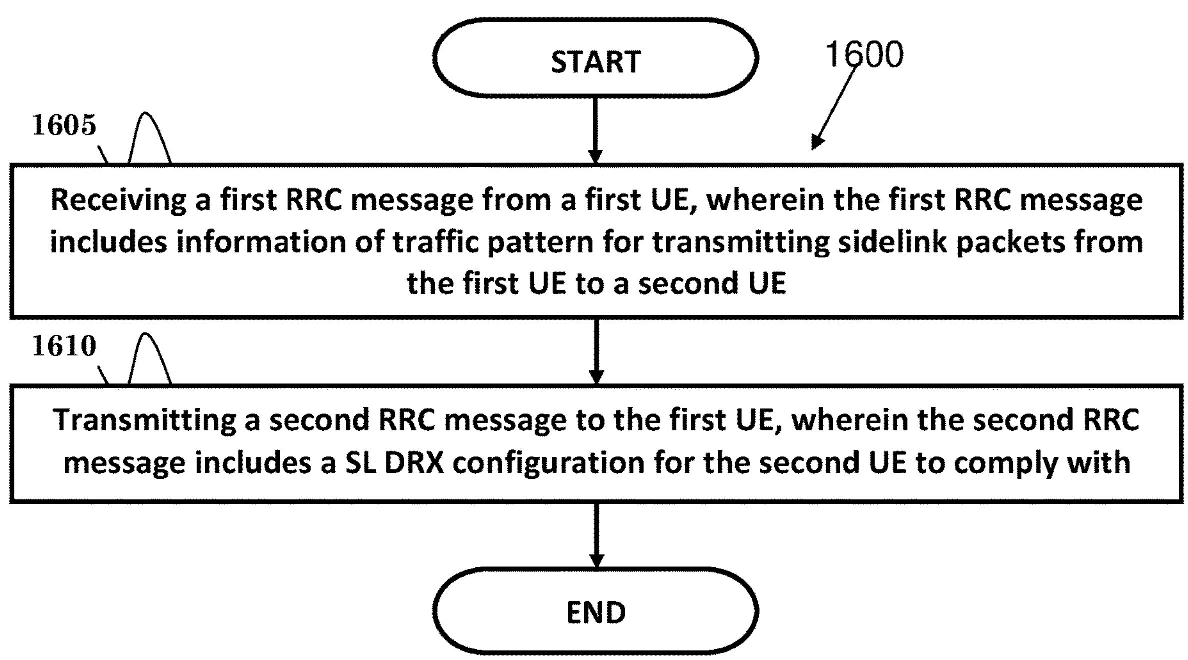
FIG. 16 is a flow chart according to one exemplary embodiment.

FIG. 16 is a flow chart 1600 according to one exemplary embodiment from the perspective of a network node to configure a UE with SL DRX. In step 1605, the network node receives a first RRC message from a first UE, wherein the first RRC message includes information of traffic pattern for transmitting sidelink packets from the first UE to a second UE. In step 1610, the network node transmits a second RRC message to the first UE, wherein the second RRC message includes a SL DRX configuration for the second UE to comply with (e.g., for the second UE to determine a period of monitoring sidelink control channel from the first UE).

In one embodiment, the first UE and the second UE could establish a unicast link. The first RRC message may include a destination identity of the second UE or a destination index of the destination identity. The information of traffic pattern may include at least one of traffic periodicity, timing offset, message size, and/or an identity of a sidelink QoS flow.

In one embodiment, the SL DRX configuration may include parameters used to control a period of the second UE monitoring sidelink control channel. The parameters used to control a period of the second UE monitoring sidelink control channel may include at least one of drx-onDurationTimerSL, drx-InactivityTimerSL, drx-LongCycleStartOffsetSL, drx-ShortCycleSL, drx-SlotOffsetSL, drx-HARQ-RTT-TimerSL, and/or drx-RetransmissionTimerSL.

In one embodiment, the first RRC message may be a UEAssistanceInformation or SidelinkUEInformationNR message. The second RRC message may be a RRCReconfiguration message. The network node may be a base station (e.g. gNB).

Referring back to FIGS. 3 and 4, in one exemplary embodiment of a network node to configure a UE with SL DRX. The network node 300 includes a program code 312 stored in the memory 310. The CPU 308 could execute program code 312 to enable the network node (i) to receive a first RRC message from a first UE, wherein the first RRC message includes information of traffic pattern for transmitting sidelink packets from the first UE to a second UE, and (ii) to transmitting a second RRC message to the first UE, wherein the second RRC message includes a SL DRX configuration for the second UE to comply with. Furthermore, the CPU 308 can execute the program code 312 to perform all of the above-described actions and steps or others described herein.

Figure 17:
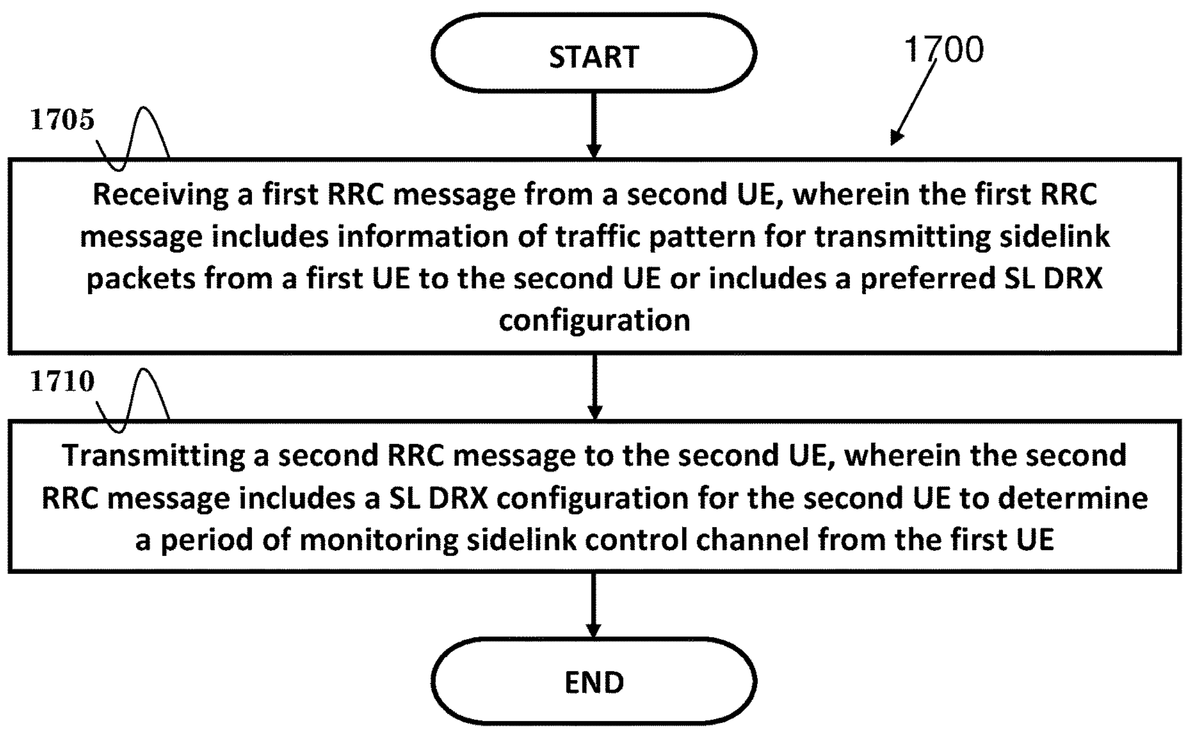
FIG. 17 is a flow chart according to one exemplary embodiment.

FIG. 17 is a flow chart 1700 according to one exemplary embodiment from the perspective of a network node to configure a UE with SL DRX. In step 1705, the network node receives a first RRC message from a second UE, wherein the first RRC message includes information of traffic pattern for transmitting sidelink packets from a first UE to the second UE or includes a preferred SL DRX configuration. In step 1710, the network node transmits a second RRC message to the second UE, wherein the second RRC message includes a SL DRX configuration for the second UE to determine a period of monitoring sidelink control channel from the first UE.

In one embodiment, the network node could determine the SL DRX configuration based on the information of traffic pattern or the preferred SL DRX configuration. The first UE and the second UE could establish a unicast link.

In one embodiment, the first RRC message may include a destination identity of the first UE or a destination index of the destination identity. The information of traffic pattern may include at least one of traffic periodicity, timing offset, message size, and/or an identity of a sidelink QoS flow.

In one embodiment, the preferred SL DRX configuration may include parameters used to indicate a period of the second UE monitoring sidelink control channel. The parameters used to indicate a period of the second UE monitoring sidelink control channel may include at least one of drx-onDurationTimerSL, drx-InactivityTimerSL, drx-LongCycleStartOffsetSL, drx-ShortCycleSL, drx-SlotOffsetSL, drx-HARQ-RTT-TimerSL, and/or drx-RetransmissionTimerSL.

In one embodiment, the SL DRX configuration may include parameters used to control a period of the second UE monitoring sidelink control channel. The parameters used to control a period of the second UE monitoring sidelink control channel may include at least one of drx-onDurationTimerSL, drx-InactivityTimerSL, drx-LongCycleStartOffsetSL, drx-ShortCycleSL, drx-SlotOffsetSL, drx-HARQ-RTT-TimerSL, and/or drx-RetransmissionTimerSL.

In one embodiment, the first RRC message may be a UEAssistanceInformation or SidelinkUEInformationNR message. The second RRC message may be a RRCReconfiguration message. The network node may be a base station (e.g. gNB).

Referring back to FIGS. 3 and 4, in one exemplary embodiment of a network node to configure a UE with SL DRX. The network node 300 includes a program code 312 stored in the memory 310. The CPU 308 could execute program code 312 to enable the network node (i) to receive a first RRC message from a second UE, wherein the first RRC message includes information of traffic pattern for transmitting sidelink packets from a first UE to the second UE or includes a preferred SL DRX configuration, and (ii) to transmit a second RRC message to the second UE, wherein the second RRC message includes a SL DRX configuration for the second UE to determine a period of monitoring sidelink control channel from the first UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a first User Equipment (UE) to support Sidelink (SL) Discontinuous Reception (DRX), comprising:

establishing a unicast link with a second UE;

receiving a SL DRX configuration of the second UE from the second UE;

transmitting a Radio Resource Control (RRC) message for providing the SL DRX configuration of the second UE to a network node, wherein the RRC message is a SidelinkUElnformationNR message;

receiving a sidelink grant from the network node, wherein the sidelink grant indicates sidelink resources; and performing a sidelink transmission to the second UE based on the sidelink resources.

2. The method of claim 1, wherein the first UE is a transmitting UE, and the second UE is a receiving UE.

3. The method of claim 1, wherein the SL DRX configuration includes parameters used to control the period of the second UE monitoring sidelink control channel.

4. The method of claim 1, wherein the SL DRX configuration configures at least one of an on-duration timer used for determining a duration at the beginning of a SL DRX cycle, a slot offset used for determining a delay before starting the on-duration timer, an inactive timer used for determining a duration after a Physical Sidelink Control Channel (PSCCH) occasion in which a sidelink control information indicates a sidelink transmission, a retransmission timer used for determining a maximum duration until a sidelink retransmission is received, a cycle length used for determining a length of the SL DRX cycle, a short cycle length used for determining a length of a second SL DRX cycle shorter than the length of the SL DRX cycle, a cycle start offset used for determining a subframe where the SL DRX cycle starts, and/or a round trip-time timer used for determining a maximum duration before a sidelink Hybrid Automatic Repeat Request (HARQ) retransmission grant is expected.

5. The method of claim 1, wherein the network node is a base station.

6. The method of claim 1, further comprising:

receiving a feedback associated with the sidelink transmission from the second UE, wherein the feedback is a HARQ positive acknowledgement or a HARQ negative acknowledgement.

7. A first User Equipment (UE) to support Sidelink (SL) Discontinuous Reception (DRX), comprising:

a processor; and a memory operatively coupled to the processor, wherein the processor is configured to execute a program code to:

establish a unicast link with a second UE;

receive a SL DRX configuration of the second UE from the second UE;

transmit a Radio Resource Control (RRC) message for providing the SL DRX configuration of the second UE to a network node, wherein the RRC message is a SidelinkUElnformationNR message;

receive a sidelink grant from the network node, wherein the sidelink grant indicates sidelink resources; and perform a sidelink transmission to the second UE based on the sidelink resources.

8. The first UE of claim 7, wherein the first UE is a transmitting UE, and the second UE is a receiving UE.

9. The first UE of claim 7, wherein the SL DRX configuration includes parameters used to control the period of the second UE monitoring sidelink control channel.

10. The first UE of claim 7, wherein the SL DRX configuration configures at least one of an on-duration timer used for determining a duration at the beginning of a SL DRX cycle, a slot offset used for determining a delay before starting the on-duration timer, an inactive timer used for determining a duration after a Physical Sidelink Control Channel (PSCCH) occasion in which a sidelink control information indicates a sidelink transmission, a retransmission timer used for determining a maximum duration until a sidelink retransmission is received, a cycle length used for determining a length of the SL DRX cycle, a short cycle length used for determining a length of a second SL DRX cycle shorter than the length of the SL DRX cycle, a cycle start offset used for determining a subframe where the SL DRX cycle starts, and/or a round trip-time timer used for determining a maximum duration before a sidelink Hybrid Automatic Repeat Request (HARQ) retransmission grant is expected.

11. The first UE of claim 7, wherein the network node is a base station.

12. The first UE of claim 7, wherein the processor is further configured to execute a program code to:

receive a feedback associated with the sidelink transmission from the second UE, wherein the feedback is a HARQ positive acknowledgement or a HARQ negative acknowledgement.

* * * * *